United States Patent
Stere et al.

(10) Patent No.: US 11,633,671 B2
(45) Date of Patent: Apr. 25, 2023

(54) METHOD AND APPARATUS FOR DYNAMIC MANAGEMENT OF FORMATIONS IN A VIDEO GAME

(71) Applicant: SQUARE ENIX LIMITED, London (GB)

(72) Inventors: Quentin Stere, Montréal (CA); Raphael Dermesropian, Montréal (CA)

(73) Assignee: Square Enix Ltd., London (GB)

( * ) Notice: Subject to any disclaimer, the term of this patent is extended or adjusted under 35 U.S.C. 154(b) by 0 days.

(21) Appl. No.: 17/162,843

(22) Filed: Jan. 29, 2021

(65) Prior Publication Data

US 2021/0268381 A1 Sep. 2, 2021

(30) Foreign Application Priority Data

Feb. 28, 2020 (CA) ................................. 3074299

(51) Int. Cl.
  *A63F 13/55* (2014.01)
  *G06T 19/00* (2011.01)

(52) U.S. Cl.
  CPC ............ *A63F 13/55* (2014.09); *G06T 19/003* (2013.01)

(58) Field of Classification Search
  CPC .............................. A63F 13/55; G06T 19/003
  See application file for complete search history.

(56) References Cited

U.S. PATENT DOCUMENTS

| | | | | |
|---|---|---|---|---|
| 3,653,667 A | * | 4/1972 | Primoff | A63F 3/0457 273/243 |
| 4,317,487 A | * | 3/1982 | Merkl | C09K 8/845 166/305.1 |
| 4,391,444 A | * | 7/1983 | Bromley | A63F 3/00643 463/38 |
| 4,645,209 A | * | 2/1987 | Goulter | A63F 3/00176 273/271 |
| 4,781,595 A | * | 11/1988 | Cox | A63F 3/0685 434/328 |
| 4,953,864 A | * | 9/1990 | Katz | A63F 9/181 273/138.2 |
| 7,059,606 B2 | * | 6/2006 | Butcher | A63F 9/0073 273/450 |

(Continued)

OTHER PUBLICATIONS

Van Der Heijden, M. et al. "Dynamic Formations in Real-Time Strategy Games." 2008 IEEE Symposium on Computational Intelligence and Games, Dec. 15-18, 2008, Perth, WA, pp. 47-54.

*Primary Examiner* — David L Lewis
*Assistant Examiner* — Matthew D Hoel
(74) *Attorney, Agent, or Firm* — Fenwick & West LLP

(57) ABSTRACT

A computer-implemented method, non-transitory computer-readable medium and apparatus for dynamic management of formations in a video game. The method includes maintaining a virtual three-dimensional environment and causing a plurality of video game characters to travel along a path in the virtual three-dimensional environment in a formation. The formation has a formation type and the formation type is a first formation type. The method also includes moving the formation along the path. The method also includes, responsive to determining a change in characteristics of the path at a point in the virtual three-dimensional environment that is ahead of the formation, changing the formation type to a second formation type in advance of the change in characteristics of the path.

28 Claims, 27 Drawing Sheets

(56) References Cited

U.S. PATENT DOCUMENTS

| | | | | |
|---|---|---|---|---|
| 7,114,721 B2* | 10/2006 | Micarelli | | A63F 3/00 |
| | | | | 273/242 |
| 8,721,413 B2* | 5/2014 | Mohammed | | A63F 9/10 |
| | | | | 463/9 |
| 8,790,178 B1* | 7/2014 | Fontaine | | A63F 13/35 |
| | | | | 463/31 |
| 8,974,299 B1* | 3/2015 | Fontaine | | A63F 13/56 |
| | | | | 463/31 |
| 9,155,968 B2* | 10/2015 | Hedrick | | A63F 13/35 |
| 9,623,322 B1* | 4/2017 | Wakeford | | A63F 13/23 |
| 9,868,063 B1* | 1/2018 | Wakeford | | A63F 13/77 |
| 10,022,627 B2* | 7/2018 | Wakeford | | A63F 13/795 |
| 10,322,346 B2* | 6/2019 | Dong | | A63F 13/35 |
| 10,398,987 B2* | 9/2019 | Wakeford | | A63F 13/795 |
| 10,406,438 B2* | 9/2019 | Catlin | | A63F 13/35 |
| 10,843,086 B2* | 11/2020 | Wakeford | | A63F 13/40 |
| 10,888,784 B2* | 1/2021 | Guimaraes | | A63F 13/42 |
| 2003/0083128 A1* | 5/2003 | Mifune | | A63F 13/828 |
| | | | | 463/31 |
| 2005/0104298 A1* | 5/2005 | Butcher | | A63F 9/0073 |
| | | | | 273/450 |
| 2006/0145420 A1* | 7/2006 | Micarelli | | A63F 3/00 |
| | | | | 273/242 |
| 2007/0202953 A1* | 8/2007 | Taninami | | A63F 13/795 |
| | | | | 463/42 |
| 2010/0259007 A1* | 10/2010 | Dixon | | A63F 3/0423 |
| | | | | 273/299 |
| 2010/0289215 A1* | 11/2010 | Tan | | B44C 3/123 |
| | | | | 273/156 |
| 2012/0068407 A1* | 3/2012 | Yu | | A63F 3/02 |
| | | | | 273/236 |
| 2012/0088562 A1* | 4/2012 | Mohammed | | A63F 9/0612 |
| | | | | 463/9 |
| 2012/0122561 A1* | 5/2012 | Hedrick | | A63F 13/35 |
| | | | | 463/25 |
| 2014/0203507 A1* | 7/2014 | Yu | | A63F 3/00119 |
| | | | | 273/271 |
| 2014/0327209 A1* | 11/2014 | Mizanoski | | A63F 3/0423 |
| | | | | 273/272 |
| 2014/0329594 A1* | 11/2014 | Kim | | A63F 13/5372 |
| | | | | 463/31 |
| 2015/0094135 A1* | 4/2015 | Hedrick | | G07F 17/3244 |
| | | | | 463/25 |
| 2018/0071630 A1* | 3/2018 | Wakeford | | A63F 13/23 |
| 2018/0296920 A1* | 10/2018 | Dong | | A63F 13/822 |
| 2018/0318714 A1* | 11/2018 | Wakeford | | A63F 13/77 |
| 2019/0030432 A1* | 1/2019 | Catlin | | A63F 13/50 |
| 2020/0047073 A1* | 2/2020 | Wakeford | | A63F 13/23 |
| 2020/0330872 A1* | 10/2020 | Odagiri | | A63F 13/35 |
| 2020/0376383 A1* | 12/2020 | Guimaraes | | A63F 13/573 |
| 2021/0060427 A1* | 3/2021 | Miyake | | A63F 13/56 |
| 2021/0170279 A1* | 6/2021 | Anderson | | A63F 13/213 |
| 2021/0268381 A1* | 9/2021 | Stere | | G06T 19/003 |
| 2021/0370177 A1* | 12/2021 | Li | | A63F 13/44 |
| 2022/0233959 A1* | 7/2022 | Tsuda | | A63F 13/56 |
| 2022/0258054 A1* | 8/2022 | Matsumoto | | A63F 13/42 |
| 2022/0258055 A1* | 8/2022 | Sato | | A63F 13/837 |

* cited by examiner

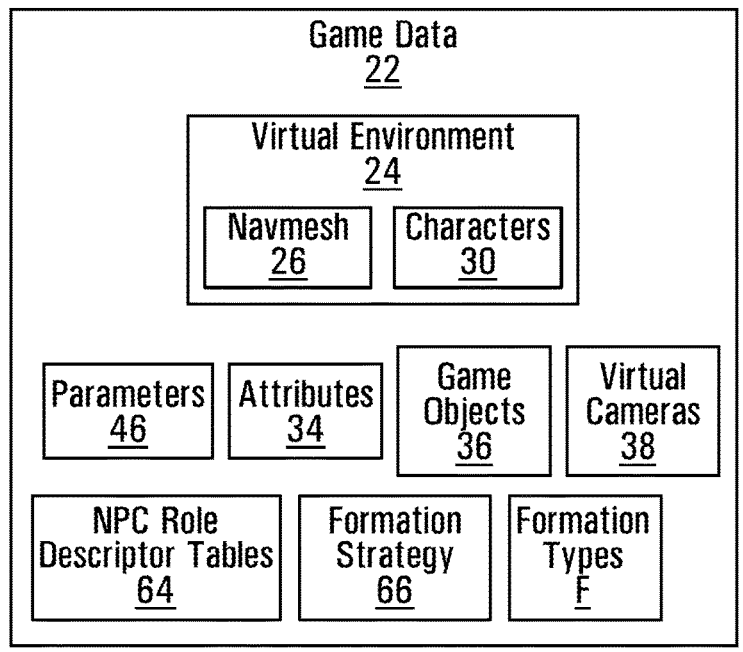
FIG. 1D
| Character | Attributes 34 | | |
|---|---|---|---|
| 30i | Character Type (e.g., PC or NPC) 32 | Spatial Coordinates (X,Y,Z) | Other Attributes 33 |
| ... | | | |
| ... | | | |
FIG. 1E
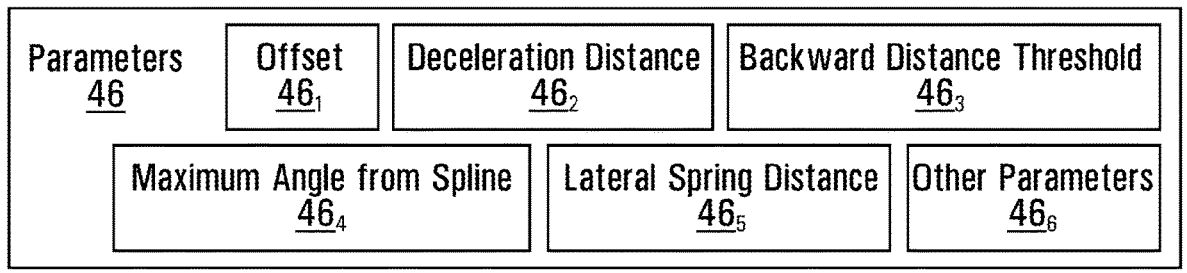
FIG. 1F

| Position Role Descriptor Table (Formation Type $FT_1$) 60 | | |
|---|---|---|
| Position $P_j$ | Role 650 | Must fit role exactly 660 |
| $P_1$ | Lead | YES |
| $P_2$ | Sidekick | NO |
| $P_3$ | Angry | NO |
| $P_4$ | Close | NO |
| $P_5$ | Free | N/A |
| $P_6$ | Close | YES |

| Position Role Descriptor Table (Formation Type $FT_2$) 60 | | |
|---|---|---|
| Position $P_j$ | Role 650 | Must fit role exactly 660 |
| $P_1$ | Sidekick | YES |
| $P_2$ | Lead | NO |
| $P_3$ | Angry | YES |
| $P_4$ | Close | NO |
| $P_5$ | Free | N/A |
| $P_6$ | Close | YES |

| Position Role Descriptor Table (Formation Type $FT_3$) 60 | | |
|---|---|---|
| Position $P_j$ | Role 650 | Must fit role exactly 660 |
| $P_1$ | Lead | YES |
| $P_2$ | Sidekick | NO |
| $P_3$ | Close | NO |
| $P_4$ | Close | NO |
| $P_5$ | Free | N/A |
| $P_6$ | Close | YES |

| Position Role Descriptor Table (Formation Type $FT_4$) 60 | | |
|---|---|---|
| Position $P_j$ | Role 650 | Must fit role exactly 660 |
| $P_1$ | Lead | YES |
| $P_2$ | Sidekick | NO |
| $P_3$ | Free | YES |
| $P_4$ | Close | NO |
| $P_5$ | Free | N/A |
| $P_6$ | Close | YES |

FIG. 7

| Active Group ID 610 | Selected formation type 620 | Formation master M | Spatial coordinates of formation reference point 630 | Position 640 | Role 650 | Character 30 |
|---|---|---|---|---|---|---|
| Group ID | $FT_1$ | PC | (X, Y, Z) | $P_1$ | Lead | $NPC_2$ |
| | | | | $P_2$ | Sidekick | $NPC_3$ |
| | | | | $P_3$ | Angry | $NPC_5$ |
| | | | | $P_4$ | Left | $NPC_1$ |
| | | | | $P_5$ | Free | Not Occupied |
| | | | | $P_6$ | Free | $NPC_4$ |

FIG. 10A

METHOD AND APPARATUS FOR DYNAMIC MANAGEMENT OF FORMATIONS IN A VIDEO GAME

FIELD

The present disclosure relates to video games and, more particularly, to a method and system for dynamic management of formations in a video game.

BACKGROUND

In some video games, the game engine is programmed so that, under certain conditions, a group of non-playing characters is assembled into a "formation". The members of the formation follow a playing character along a navmesh (a collection of polygons that define traversable areas of a virtual environment). The playing character is under control of a player and therefore may end up rapidly accelerating and traveling to arbitrary locations on the navmesh. Such unpredictable movement of the playing character may cause members of the formation to have to suddenly change course so as to stay on the navmesh. The resulting visual effect is unnatural, making gameplay less desirable or entertaining. As such, there is a need to manage the movement of a formation that will result in a smoother, more natural on-screen effect.

SUMMARY

According to a first aspect, there is provided a computer-implemented method. The computer-implemented method comprises maintaining a virtual three-dimensional environment. The computer-implemented method also comprises assembling a plurality of video game characters into a formation. The formation has a formation type and the formation type is a first formation type. The computer-implemented method further comprises moving the formation along a path in the virtual three-dimensional environment. The computer-implemented method further comprises, responsive to determining a change in characteristics of the path at a point in the virtual three-dimensional environment that is ahead of the formation, changing the formation type to a second formation type in advance of the change in characteristics of the path.

According to another aspect, there is provided a non-transitory computer-readable storage medium. The non-transitory computer-readable storage medium comprises computer-readable instructions which, when read and executed by at least one processor, cause the at least one processor to execute a method. The method comprises maintaining a virtual three-dimensional environment. The method also comprises assembling a plurality of video game characters into a formation. The formation has a formation type and the formation type is a first formation type. The method further comprises moving the formation along a path in the virtual three-dimensional environment. The method further comprises, responsive to determining a change in characteristics of the path at a point in the virtual three-dimensional environment that is ahead of the formation, changing the formation type to a second formation type in advance of the change in characteristics of the path.

According to yet another aspect, there is provided an apparatus. The apparatus, which may be a gaming device, comprises at least one processor. The apparatus also comprises a memory storing data and instructions, the data representing a virtual three-dimensional environment. The apparatus further comprises an interface through which a user provides input and receives output. The at least one processor is configured to execute the instructions in the memory for implementing a computer program that generates the output in response to the received input. The computer program includes at least one process. The process comprises assembling a plurality of video game characters into a formation. The formation has a formation type and the formation type is a first formation type. The process also comprises moving the formation along a path in the virtual three-dimensional environment. The process further comprises, responsive to determining a change in characteristics of the path at a point in the virtual three-dimensional environment that is ahead of the formation, changing the formation type to a second formation type in advance of the change in characteristics of the path.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 1A, 1B, 1C, 1D, 1E and 1F show a configuration of a video game apparatus (e.g., a console or a mobile device), in accordance with a non-limiting embodiment;

FIG. 7 shows one embodiment of position role descriptor tables, in accordance with a non-limiting embodiment;

FIG. 10A shows a table summarizing information associated with a formation type, in accordance with a non-limiting embodiment;

Figure 1A:
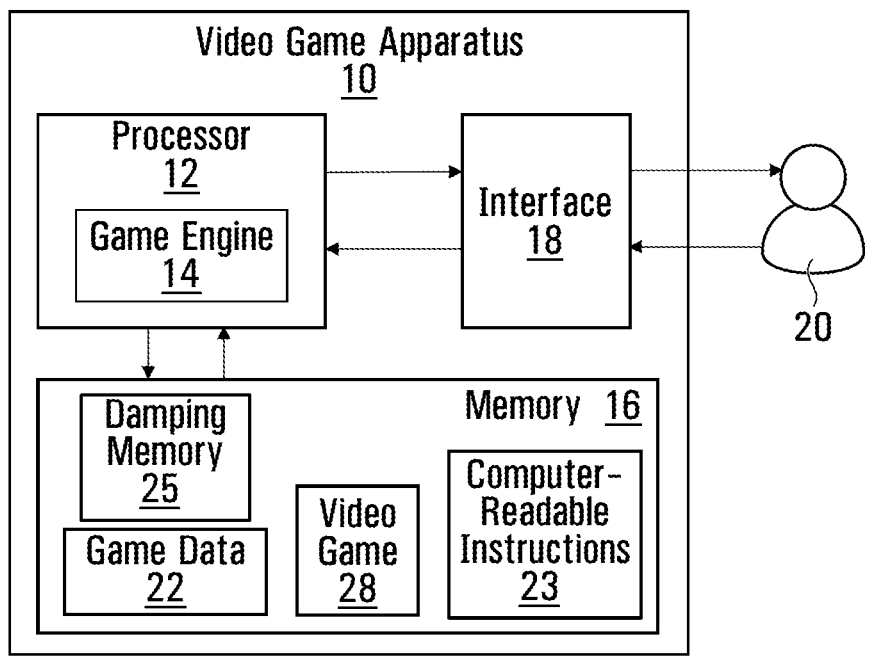

It is to be expressly understood that the description and drawings are only for the purpose of illustration of certain embodiments of the invention and are an aid for understanding. They are not intended to be a definition of the limits of the invention.

DETAILED DESCRIPTION

FIGS. 1A, 1B, 1C, 1D, 1E and 1F show a configuration of a video game apparatus 10 (e.g., a gaming device, a console or a mobile device), including a processor 12 running a game engine 14, a data memory 16 storing game data 22 and storing computer-readable instructions 23. The video game apparatus 10 also includes an input/output interface 18 through which a player 20 provides input and receives output. The game data 22 defines a three-dimensional virtual environment (world) 24 including a navigation mesh (navmesh) 26. The navmesh 26 is a collection of polygons 40 that define which areas of the virtual environment 24 are traversable by characters 30 (a plurality of individual characters $30_i$). In other words, a character $30_i$ could freely walk around, within these areas, unobstructed by trees, rocks, lava, streams, or other barriers or abysses that may be part of the virtual environment 24. Adjacent polygons $40_i$ (e.g., polygons $40_1$ and $40_2$ by way of non-limiting example shown in FIG. 2B), are connected to each other in a graph, the details of which form part of the game data 22. The characters $30_i$ may have attributes 34 such as character type 32 (whether they are a playing character (PC) or a non-playing character (NPC)), their spatial coordinates XYZ (which may be limited by the navmesh 26) as well as other attributes 33 (e.g., size, strength, personality type, etc.). These attributes 33, 34 also form part of the game data 22.

Figure 2A:
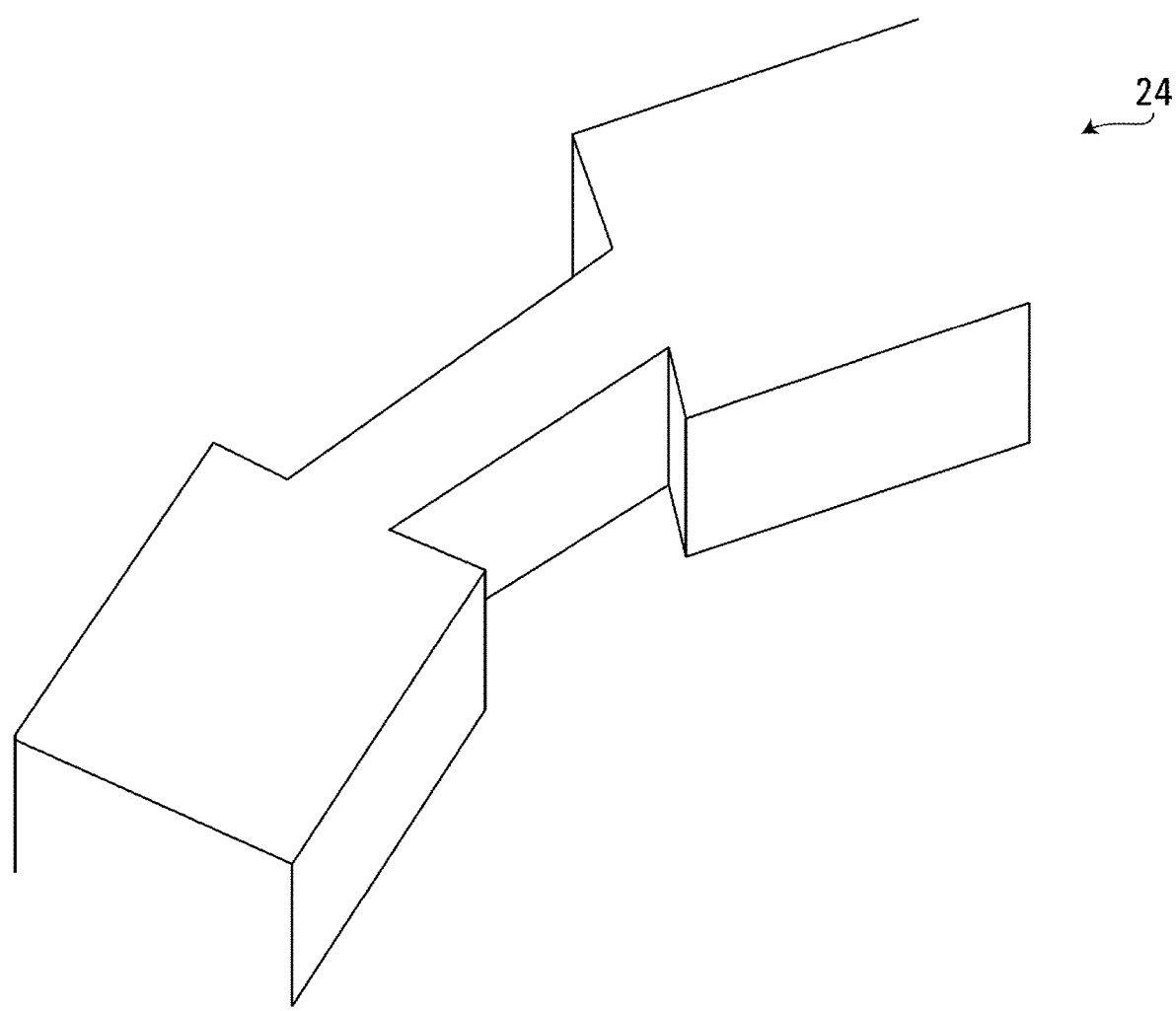
FIG. 2A shows part of a three-dimensional virtual environment, in accordance with a non-limiting embodiment.
Figure 2B:
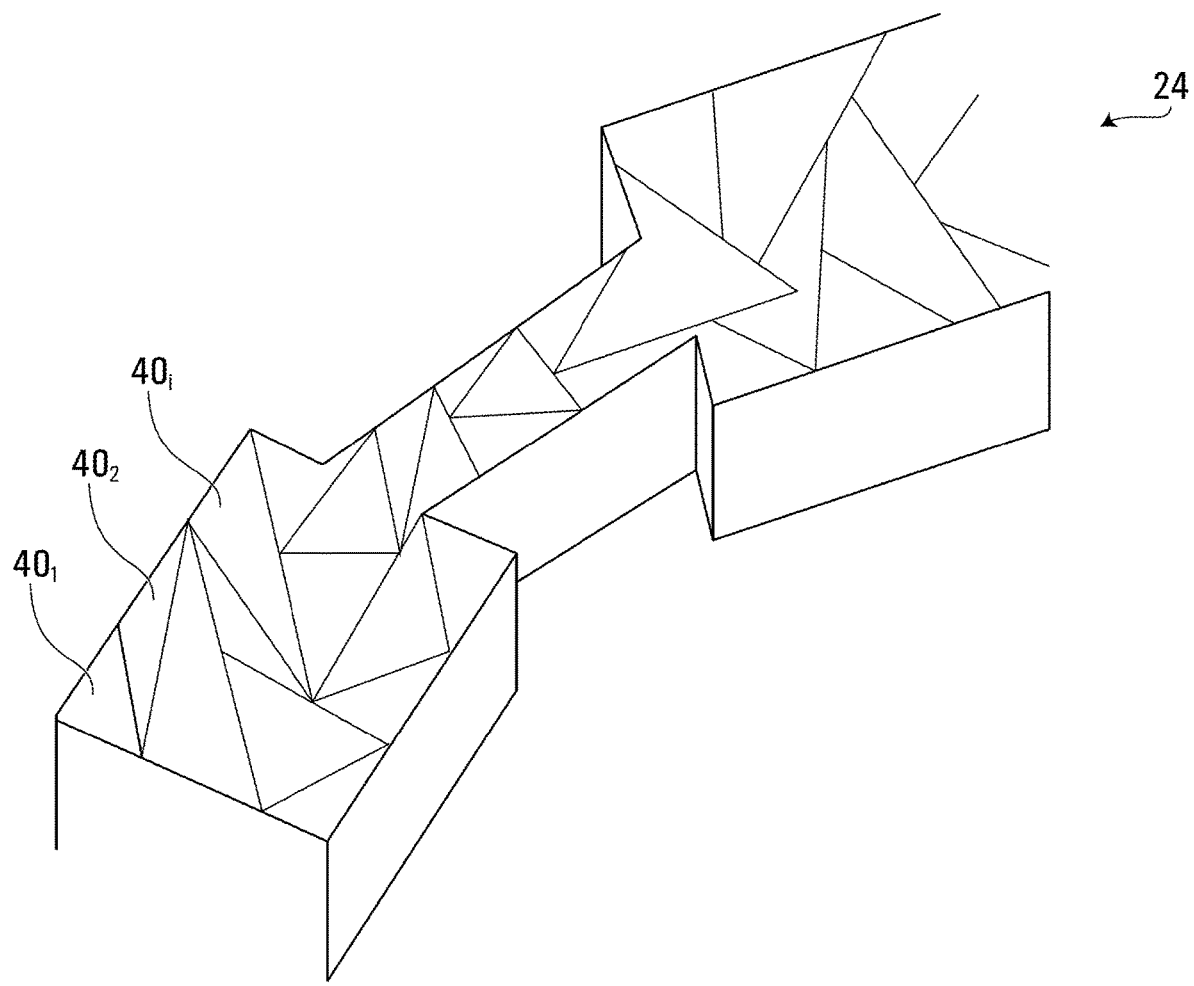
FIG. 2B shows a navigation mesh (navmesh) of the three-dimensional environment of FIG. 2A to which movement of video game characters is constrained, in accordance with a non-limiting embodiment.

By way of non-limiting example, FIG. 2A shows part of a three-dimensional virtual environment 24 and FIG. 2B shows the corresponding navmesh 26 (set of polygons) to which movement of characters 30 is constrained.

Figure 1B:
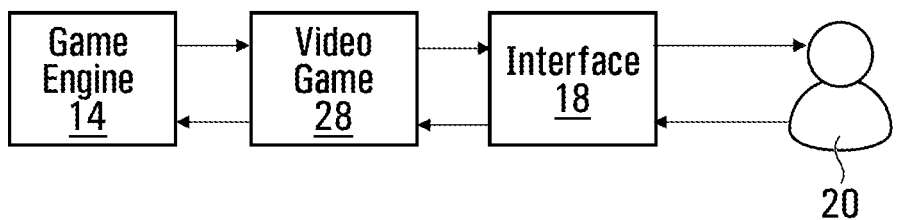
Figure 1C:
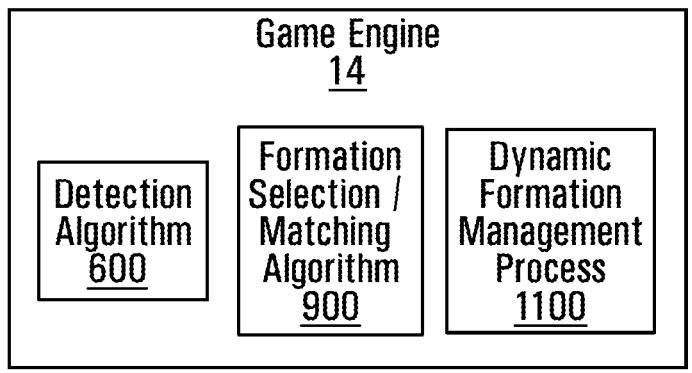

With further reference to FIG. 1B, the game engine 14 executes a video game 28. That is to say, the game engine 14 is programmed and configured to apply changes to the spatial coordinates XYZ and other attributes 33 of the characters $30_i$ and other game objects 36 based on input from one or more players 20 via the interface 18 and the game data 22. One or more virtual cameras 38 (which may themselves be game objects 36) define viewpoints from which a scene is rendered and output to the player 20 via the interface 18, allowing the player 20 to observe effects on the game objects 36 and eliciting a player response in the form of further input via the interface 18. In this way, the player 20 is said to play the video game 28 executed by the game engine 14.

Figure 3:
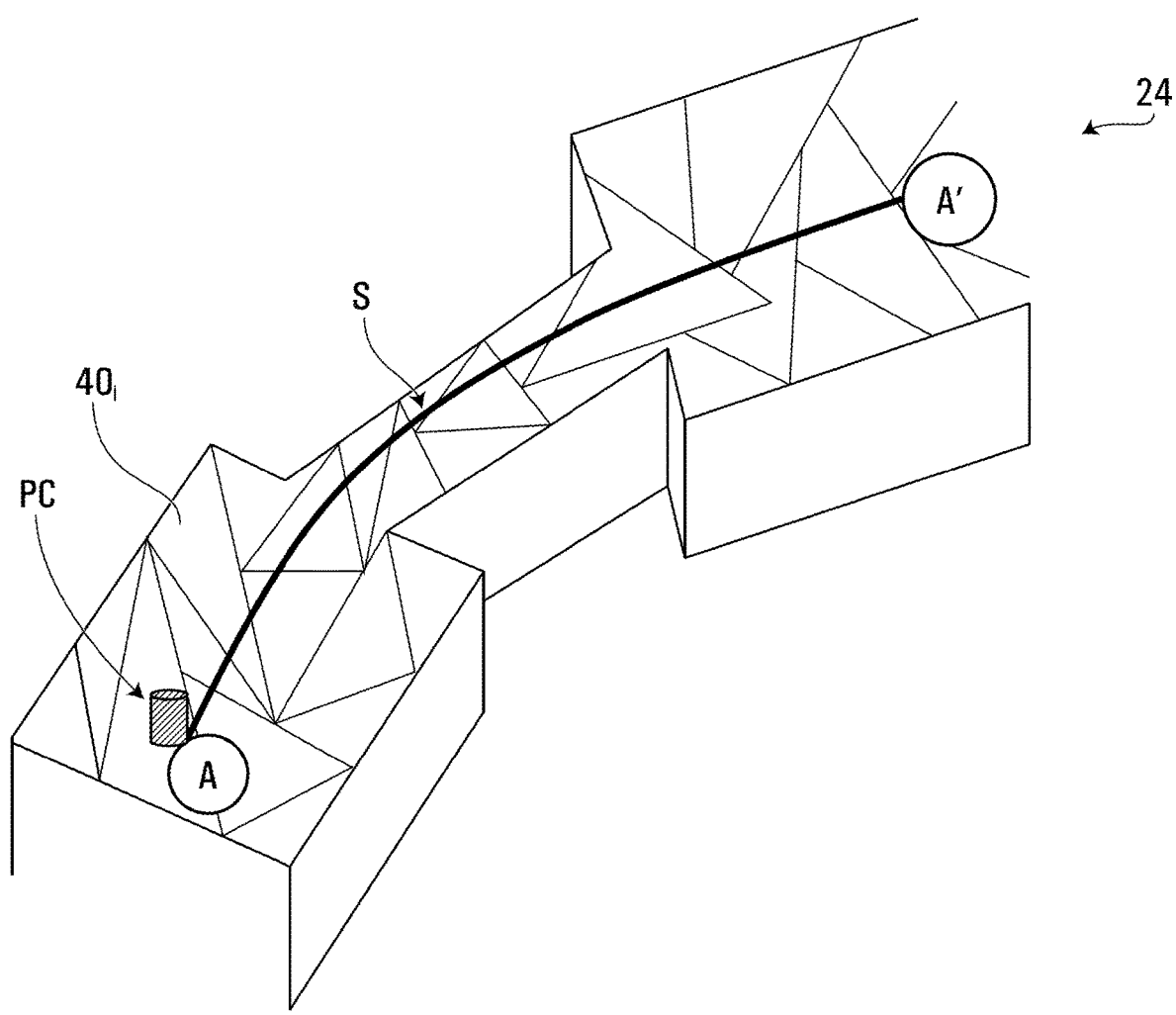
FIG. 3 shows a playing character travelling along a spline on the navmesh of FIG. 2B, in accordance with a non-limiting embodiment.

Let it be assumed for the purposes of this description that there is a single playing character (PC) defined in the virtual environment 24. By providing inputs via the interface 18, the player 20 controls navigation of the PC throughout the virtual environment 24, depending on where the PC is allowed to go, as determined by the navmesh 26. In some cases, if the PC is at a point A in the virtual environment 24 (see FIG. 3), it can be predicted that by continuing to advance through the terrain, the PC will pass a number of intermediate obstacles or terrain changes and end up at a point A'. The spatial coordinates XYZ of the pathway from point A to point A' make up a spline denoted "S". The spline S is a curvilinear path, or a series of straight segments with smooth transitions, that lies between point A and point A', and is located on the navmesh 26.

Figure 4A:
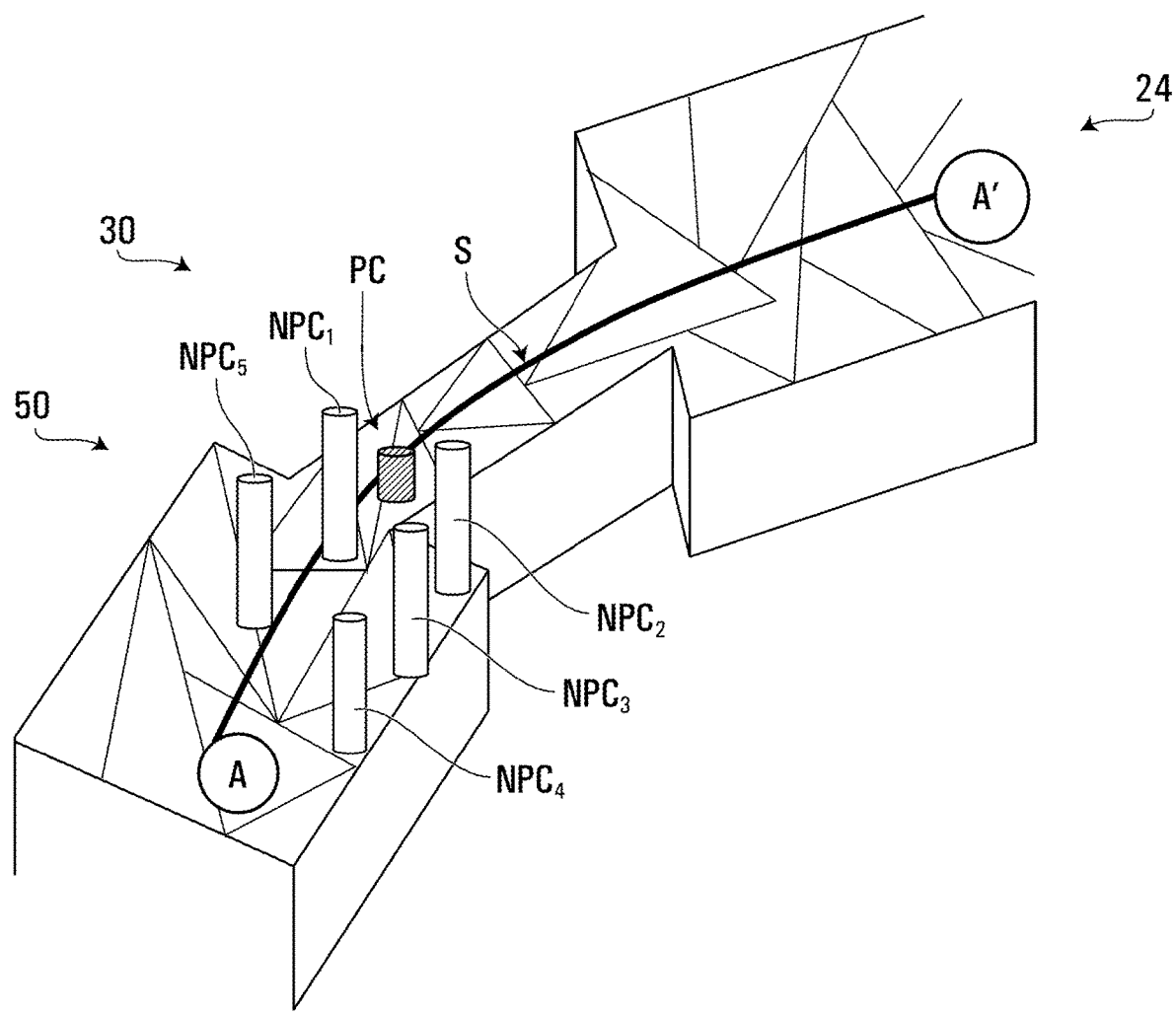
FIG. 4A shows a group of non-playing characters (NPCs) traveling on the navmesh of FIG. 2B, in accordance with a non-limiting embodiment.

Let it also be assumed for the purposes of this description that there is a plurality (a group) of non-playing characters (NPCs) 50 defined in the virtual environment 24. Because they are non-playing characters NPC as opposed to playing characters PC, the spatial coordinates XYZ of the NPCs are controlled by the game engine 14 without direct control by the player 20. In the present embodiment, as shown in FIG. 4A, there are five NPCs denoted $NPC_1$ through $NPC_5$. This is of course not to be considered as a limitation.

Formations

The game engine 14 is programmed so that, under certain conditions, a group of NPCs 50 is assembled into a "formation" along the spline S. A formation F can be viewed as a group of characters (e.g., NPCs) 30 arranged relative to one another in accordance with a "formation type" (i.e., a predefined layout) and following a "formation master" (or a master element) M, which in many cases may be the playing character PC, but in other cases may be an NPC or any other object 36 with spatial coordinates XYZ.

While a formation master M is included in the present embodiment, a formation F may follow the spline S without reference to a formation master M in other embodiments.

A given formation type $FT_i$ may be characterized by its particular spatial distribution of character positions (points) $P_i$. A given formation type $FT_i$ defines a set of relative character positions $P_i$ of the video game characters $30_i$ in the formation F. In addition, a given formation type $FT_i$ may also be characterized by other attributes or parameters (e.g., a number of positions $P_i$ in the formation, a width of the formation W etc.). Formation types FT may be stored as game data 22 in the memory 16.

Figure 4B:
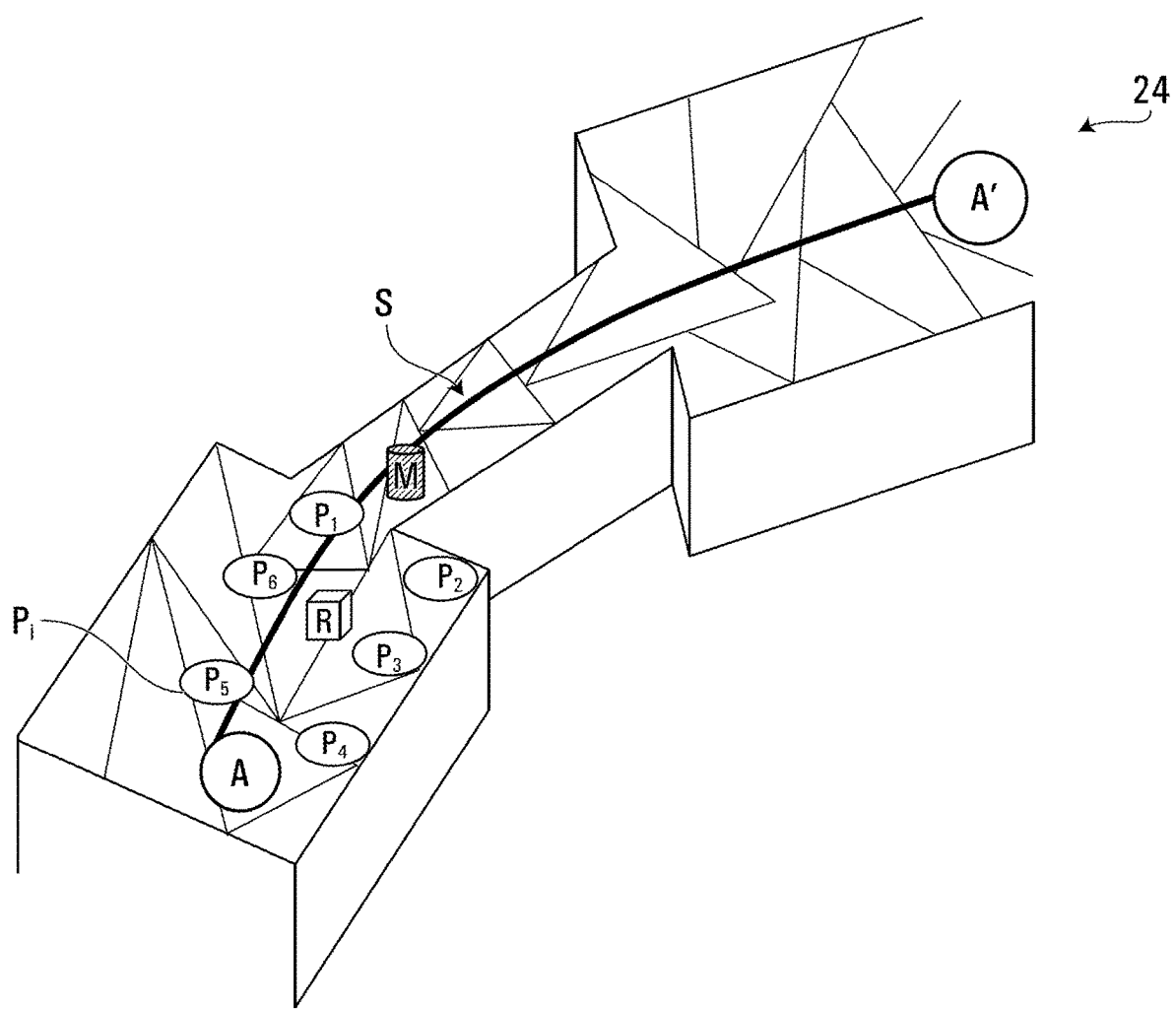
FIG. 4B shows a spatial distribution of character positions of one embodiment of a formation traveling on the navmesh of FIG. 2B, in accordance with a non-limiting embodiment.
Figure 4C:
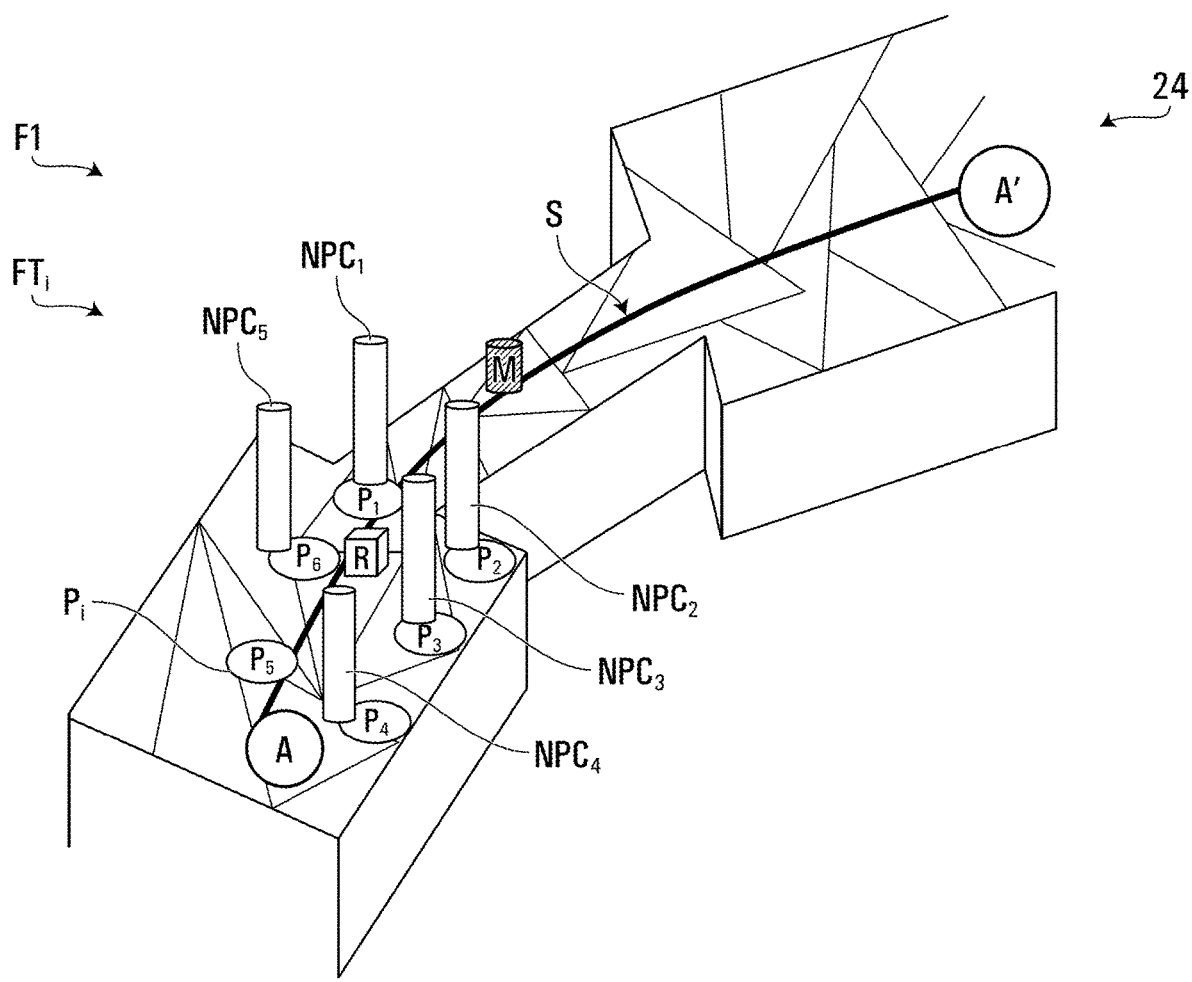
FIG. 4C shows the group of NPCs of FIG. 4A occupying the character positions of the formation shown in FIG. 4B, in accordance with a non-limiting embodiment.

An example of a formation traveling on the navmesh 26 of FIG. 2B is shown in FIG. 4C. The illustrated formation F1 has six positions $P_i$ (shown as ellipses denoted $P_1$ through $P_6$ in FIGS. 4B and 4C) although in other embodiments the number of positions $P_i$ may differ as may their relative layout. The illustrated formation F1 has a reference point (shown as a cube denoted "R"). The formation reference point R may represent the center (e.g. center point or centroid) of the formation F1. The positions $P_1$ through $P_6$ occupy spatial coordinates XYZ in space that depend on the spatial coordinates XYZ and orientation of the formation reference point R. The formation reference point R (as well as the positions $P_i$ to $P_6$ of the formation F1) follow the formation master (shown as a short cylinder denoted "M"). As such, moving the formation F1 along the path (the spline S) from point A to point A' in response to motion of the formation master M involves moving the formation reference point R of the formation F1 in response to motion of the formation master M.

By "follow the formation master" means that the spatial coordinates XYZ of the formation reference point R (e.g., the formation center) are calculated by the game engine 14 as a function of the movement of the formation master M (e.g., the PC or master element). This function may be defined by a set of parameters 46 (such as offset or delay or "springiness"/damping, in various directions, which may render the "following" motion more natural-looking). The set of parameters 46 may be stored as game data 22 in the memory 16.

In one non-limiting example of implementation, a parameter $46_1$ designating a "offset" value may be defined such that the formation center R may be offset from the formation master M by a value (e.g. representing a unit of length or a unit of time) in order to prevent the appearance of an abrupt stop of the formation F1 should the formation master M stop moving. Thus, an offset may be observed between the movement of the formation center R and the formation master M. Such an offset may have a positive or a negative value.

In another non-limiting example of implementation, a parameter 462 designating a "deceleration distance" value may be defined such that the center of formation R will keep moving by a designated value (e.g. representing a unit of length) once the formation master M stops moving. This may render following motion that may be described as 'damped' and more natural-looking.

In yet another non-limiting example of implementation, a parameter 463 designating a "backward distance threshold" value may be defined such that, if the formation master M backtracks by a designated value (e.g. representing a unit of length), the path (the spline S) will switch its direction (e.g. moving from point A' to point A rather than moving from point A to point A') in order for the formation center R to keep following the formation master M, thus reversing the direction of motion of the formation F1.

In yet another non-limiting example of implementation, a parameter 464 designating a "maximum angle from spline direction" value may be defined for each NPC such that they may be allowed a lateral range of movement from the spline S by a designated value (e.g. representing a unit of length). This may render following motion that may be described as 'springy', 'reactive' or 'elastic' and more natural-looking.

With reference to FIGS. 4B and 4C, some of the positions $P_i$ of the formation F1 may be occupied by NPCs. Specifically, in this example, five out of the six positions $P_1 \ldots P_6$ are occupied by NPCs, namely $NPC_1$ through $NPC_5$. As such, it should be appreciated that not all positions $P_i$ of the formation F1 need be occupied by NPCs, i.e., some of the positions $P_i$ may be vacant. It should also be understood that while in this example, the number of NPCs is less than the number of positions $P_i$ in the formation F1, this need not be the case in every embodiment. There may, for example, be more NPCs than there are positions $P_i$ in the formation F1.

Figure 5:
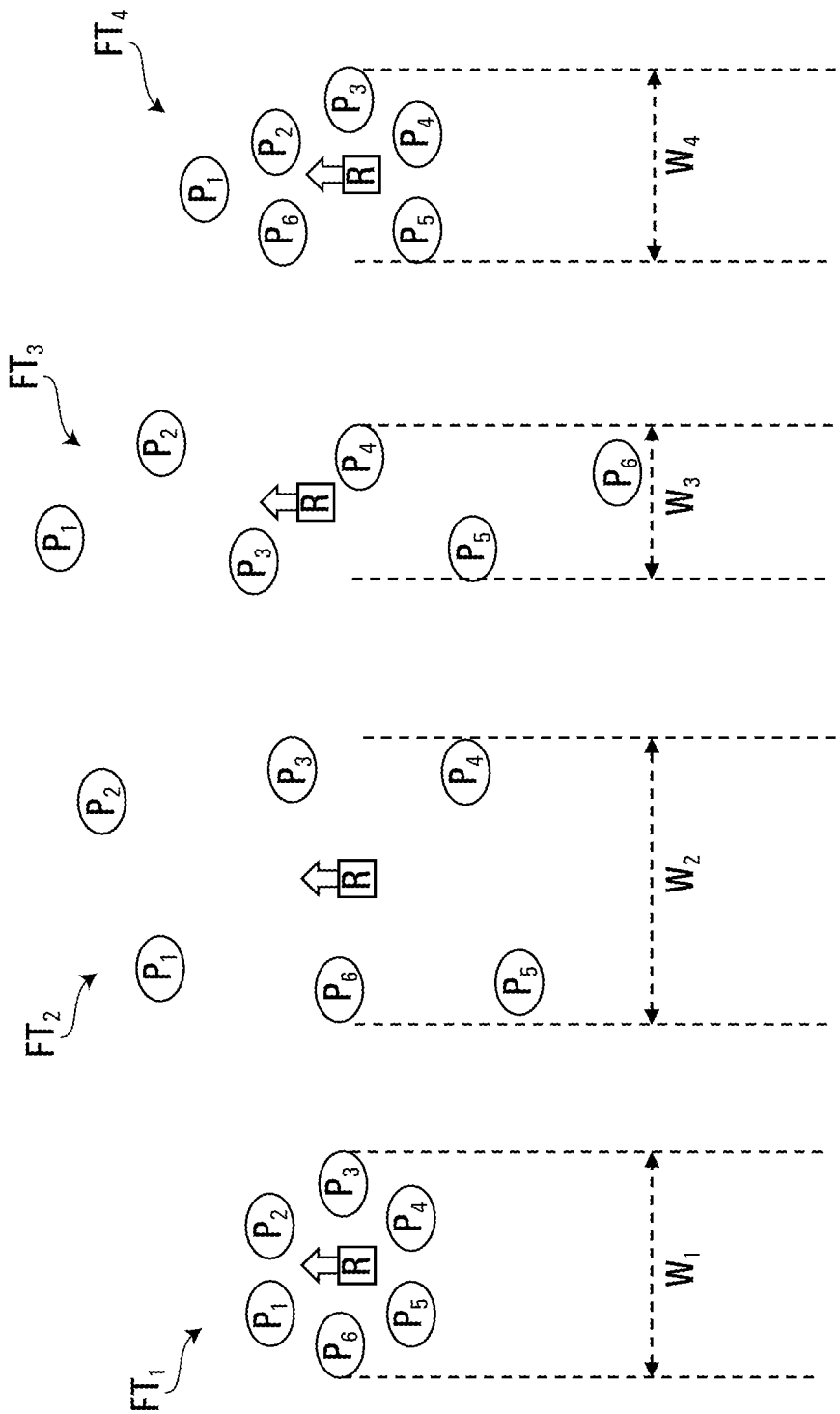
FIG. 5 is a plan view of certain allowable formation types that may be associated with the spline of FIG. 3, in accordance with a non-limiting embodiment.

Each spline (including the spline S) may be associated with one or more allowable formation types $FT_i$, which may be determined during game design. For example, FIG. 5 is a plan view of four allowable formation types $FT_1$ through $FT_4$ that may be associated with the spline S. Each of the formation types $FT_1$ through $FT_4$ has six positions $P_1$ through $P_6$ relative to a respective formation reference point R. Of course, the number of positions $P_i$ may differ across formation types FT.

Figure 6A:
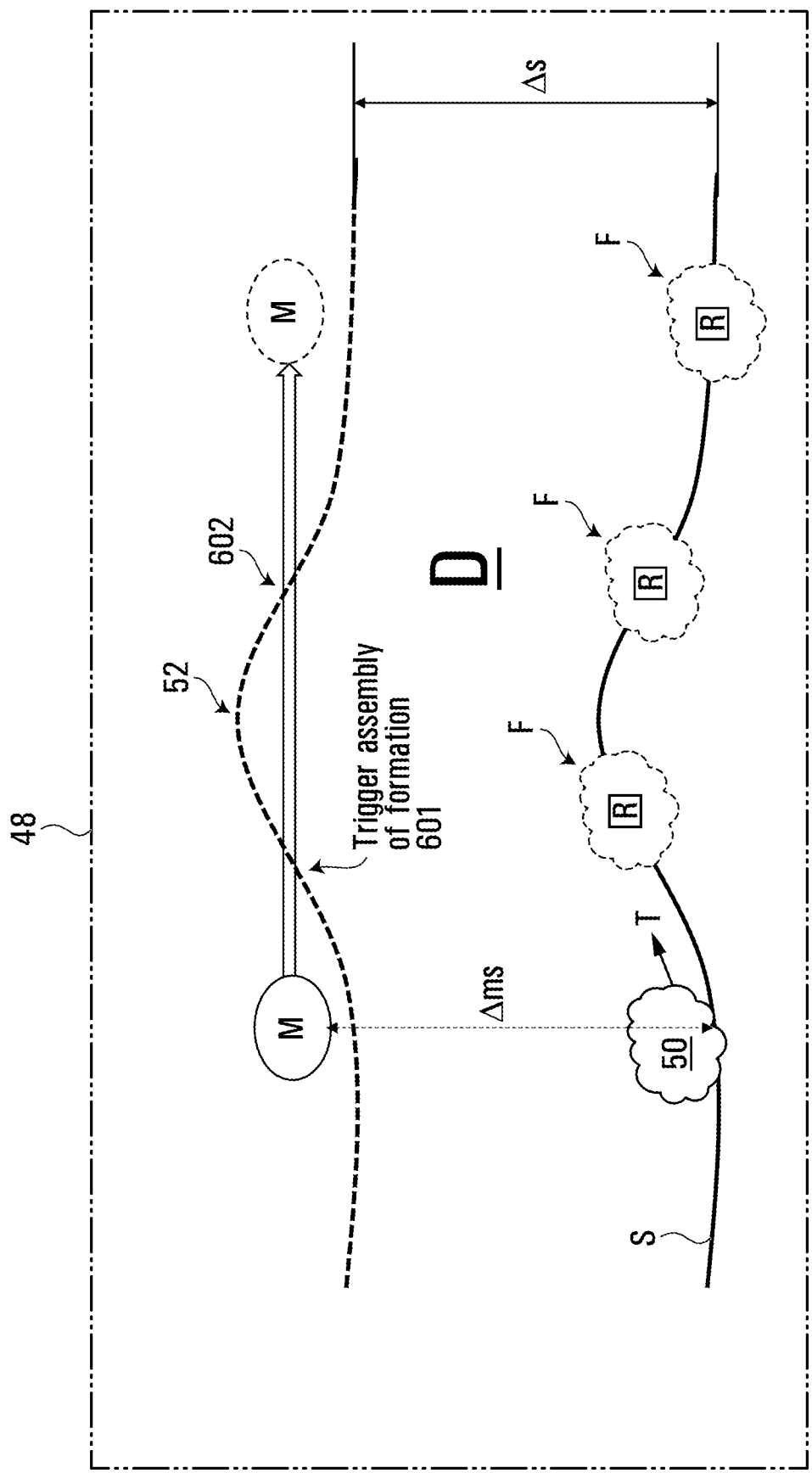
FIG. 6A is a plan view of another embodiment of a spline showing example conditions under which assembly of a formation takes place, in accordance with a non-limiting embodiment.

Example conditions under which assembly of a given formation F takes place can be described with reference to FIG. 6A, which is a plan view of another embodiment of a spline (denoted as S) surrounded by a boundary 48 defining the three-dimensional virtual environment 24. A group of NPCs 50 following the spline S along a trajectory T is also shown in FIG. 6A.

The game engine 14 is configured to execute a detection algorithm 600 for detecting when the formation master M (e.g., the PC) enters within a certain detection zone (denoted "D") surrounding the spline S. See, for example, point 601 in FIG. 6A.

The detection zone D surrounding the spline S may be characterized by a detection distance $\Delta s$, the detection distance $\Delta s$ being a distance from the spline S at which the spline S is detected by the formation master M. The detection distance $\Delta s$ may be defined as a unit of length (such as a width, a length, a radius, a diameter etc.) As such, the detection distance $\Delta s$ defines a boundary 52 of the detection zone D. The detection distance $\Delta s$ also defines the width of the spline S.

The detection distance $\Delta s$ is an indication of whether the formation master M has entered the detection zone such that the given formation F can be assembled. Thus, the detection distance $\Delta s$ may define a threshold value (of the distance between the formation master and the spline) below which the NPCs are assembled into a formation F and begin start following the formation master M.

Figure 6B:
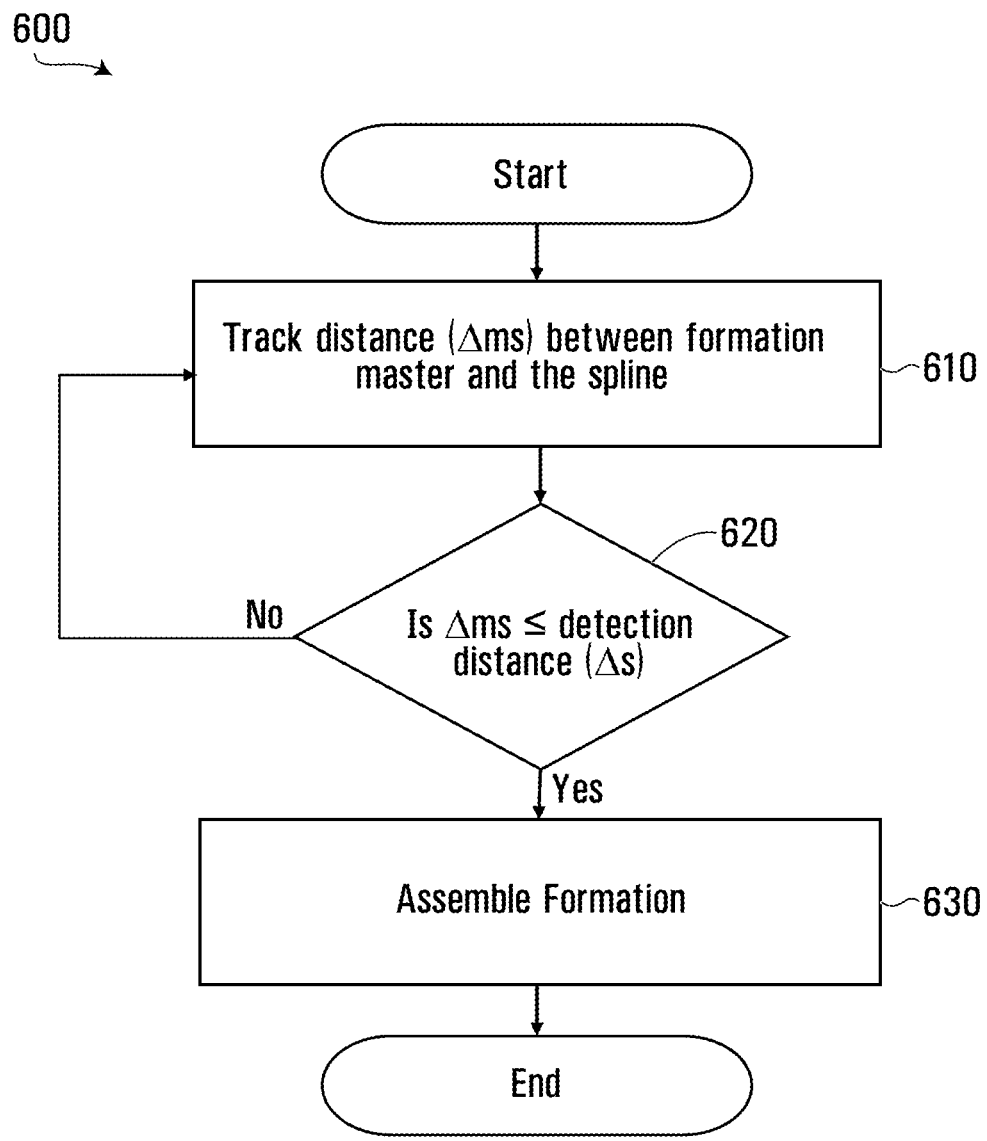
FIG. 6B is a flowchart illustrating steps of a detection algorithm, in accordance with a non-limiting embodiment.

With reference to FIG. 6B, the detection algorithm 600 includes a step of tracking a value representing a distance $\Delta ms$ between the formation master M and the spline S. At step 620, the value representing the distance $\Delta ms$ is compared to the value representing the detection distance $\Delta s$. If the value representing the distance $\Delta ms$ is less than or equal to the value representing the detection distance $\Delta s$, the NPCs are assembled into a formation F at step 630. If the distance $\Delta ms$ is greater than the distance $\Delta s$, the NPCs do not assemble into a formation.

As such, once the formation master M has entered the detection zone D surrounding the spline S, the game engine 14 may trigger assembly of a certain number of the NPCs into a formation F with a formation reference point R. Thus, once the formation master M has entered the detection zone D surrounding the spline S, the given formation F is triggered, and formation reference point R is created.

The detection distance $\Delta s$ may be configured to render more natural-looking "following" motion. In one example, the detection distance $\Delta s$ may be set to a smaller value when the virtual environment 24 comprises a narrow space (alley, corridor etc.). Setting a smaller value for the detection distance $\Delta s$ in this instance may prevent the formation master M from being detected on one side of the narrow space while preventing assembly of a given formation F on the other side of this narrow space.

The detection distance Δs may be combined with any of the parameters 46 previously discussed in order to control the movement of a given formation F and yield more natural-looking motion.

In the present embodiment, once the formation master M has entered the detection zone D and the given formation F has been assembled, the formation reference point R (e.g., the formation center) is then constrained to stay on the spline S as the formation master M moves while the formation master M is not constrained to stay on the spline S.

In other embodiments, the formation reference point R may not be constrained to stay on the spline S as the formation master M moves. In one non-limiting example of implementation, a parameter 465 designating a "lateral spring distance" value may be defined such that the center of formation R may be shifted laterally from the spline S by a designated value (e.g. representing a unit of length). Thus, the formation reference point R may be laterally offset from the spline S. Given that the formation master M is not constrained to move along the spline S, the lateral offset of the formation reference point R may allow improved follow means by the given formation F should the formation master M move away from the spline S. This may render following motion that may be described as 'reactive' and 'elastic', and more natural-looking.

Other parameters $46_i$ may also be defined in order to render the "following" motion that is more natural-looking, in response to movement of the formation master M.

For a given formation type $FT_i$, each position $P_1 \ldots P_6$ may be associated with at least one "role" as listed in a "position role descriptor table" 60 for that formation type $FT_i$. FIG. 7 shows an example of a position role descriptor table 60 for formation types $FT_1$ through $FT_4$, which indicates, for each of the six positions $P_1$ through $P_6$, a designated role 650 for that position $P_i$.

In addition, each of the characters $30_i$ (e.g., NPCs) on a given spline also has at least one designated role 652 (see NPC role descriptor table 64 in FIG. 8B, to be described later in this document).

The fact that both the positions $P_i$ and the characters $30_i$ each have a designated role 650, 652 restricts which characters $30_i$ can ultimately be placed in which positions $P_i$ of a given formation F. An algorithm (to be described later) takes care of matching positions $P_i$ with characters $30_i$ by ensuring that, for an entire set of positions P, the designated role of each given position 650 is matched (or almost matched) by the designated role 652 of whichever character $30_i$ ultimately occupies that position $P_i$.

Examples of "roles" 650, 652 (which are basically tags) can be based on a variety of factors, such as emotional characteristic (e.g., angry, intimate, etc.), story role (e.g., sidekick, antagonist, etc.) or relative spatial position (e.g., right, left, close, lead, forward, etc.). In some cases, the role 650, 652 may have a deliberately broad significance (e.g., "close"); this may provide flexibility to the end users (the level designers) when matching characters $30_i$ to positions $P_i$.

In an example, a specific position $P_i$ that is at the front of the formation F1 may be associated with the role 650 "forward". In one embodiment, a character $30_i$ also having the role 652 "forward" would occupy this position $P_i$ and therefore will be at the front of the formation F1, even if the master is behind the front of the formation F1. However, in another embodiment (and according to a different interpretation of the term "forward"), a character $30_i$ also having the role "forward" would not occupy the specific position $P_i$ unless the formation master M were ahead of the formation F1. In an example, the specific position $P_i$ may be associated with the role 650 "forward", regardless of whether the formation is moving forwards or backwards. In another example, the specific position $P_i$ may be associated with the role 650 "forward" only if the formation is moving forwards.

Another example of a role could be "free". When a particular position's designated role 650 is "free", this is used to indicate that selection of the character $30_i$ occupying this position $P_i$ will not be based on the character's designated role 652. It may be preferable to match a character $30_i$ to this position $P_i$ after characters $30_i$ have been matched to other positions $P_i$ (whose designated role 650 is not "free").

Note also that the position role descriptor table 60 may include a column 660 marked as "Must Fit Role Exactly". The entry in this column 660, for a given position $P_i$ associated with a specific role 650, indicates whether, in order for a character $30_i$ to occupy that position $P_i$, such character $30_i$ must be associated with the specific role 650 or not. If no character $30_i$ on a given spline is marked as being associated with the specific role 650 for the given position $P_i$, then the given position $P_i$ in the given formation F will be unoccupied.

The position role descriptor table 60 for each given formation type $FT_i$ may be stored as game data 22 in the memory 16.

In other embodiments, each position $P_1 \ldots P_6$ may be associated with more than one allowable role as listed in the position role descriptor table $60_i$.

Figure 8A:
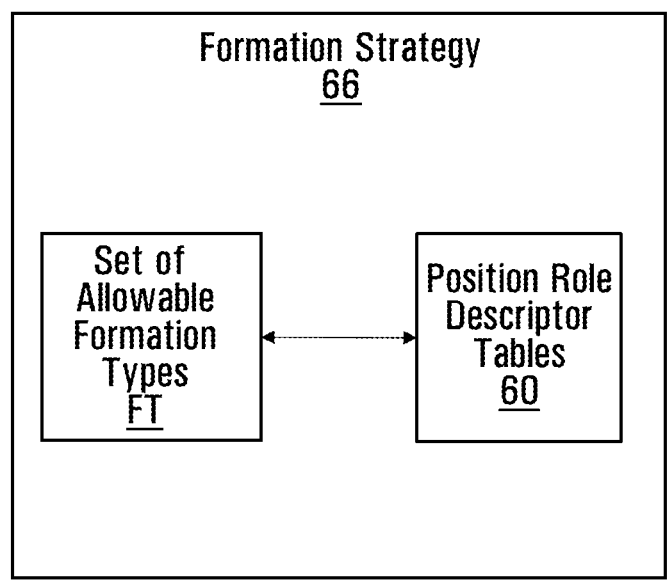
FIG. 8A shows a block diagram of a formation strategy stored in game data of a memory of the video game apparatus of FIG. 1A, in accordance with a non-limiting embodiment.
Figure 8B:
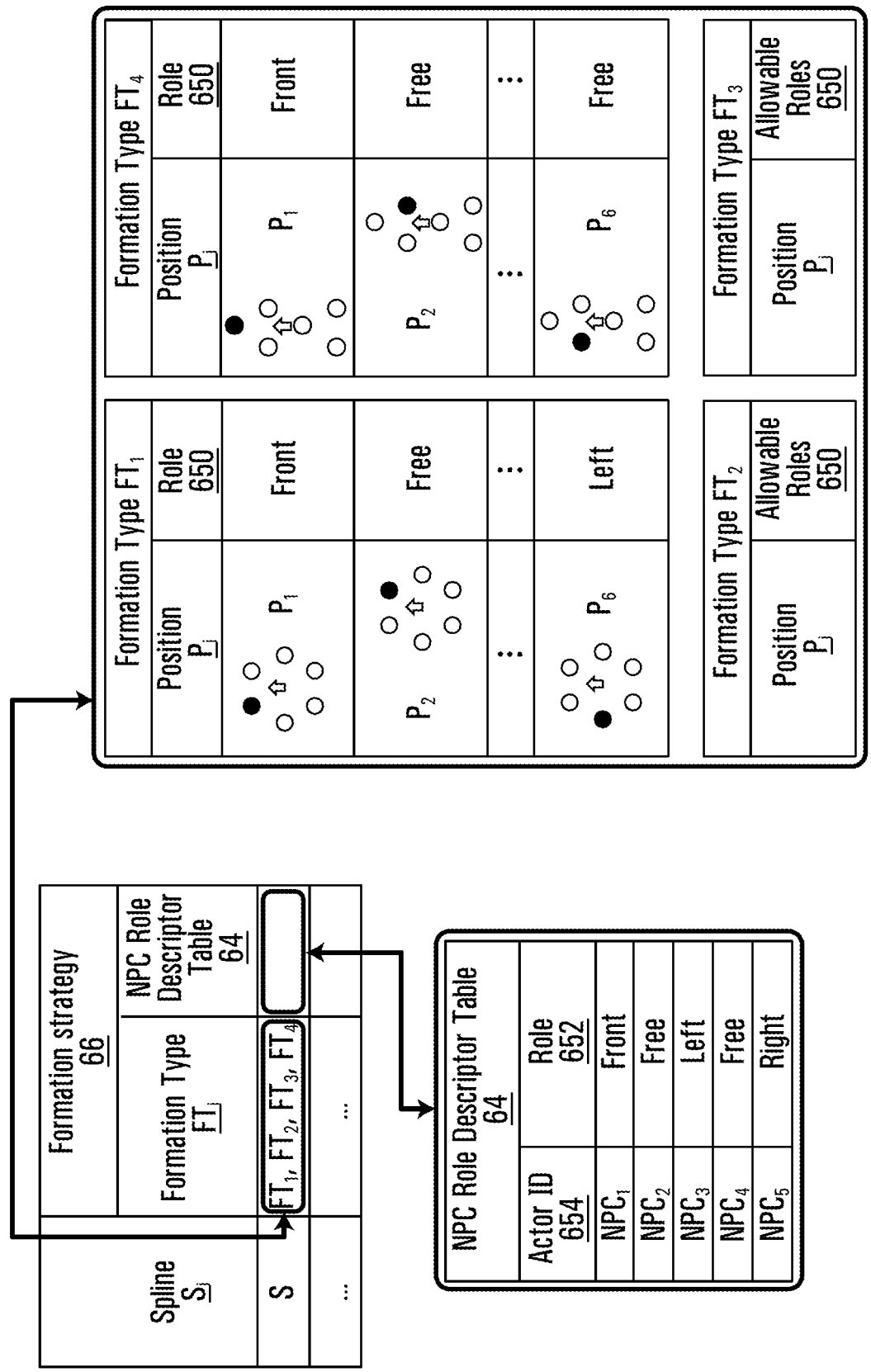
FIG. 8B shows a table storing the formation strategy for various splines, in accordance with a non-limiting embodiment.

As shown in FIG. 8B, a set of allowable formation types $\{FT_i\}$ for a given spline, together with the position role descriptor table 60 for each allowable formation type $FT_i$, may be referred to as a "formation strategy" 66 for the given spline. The formation strategy 66 may be stored as game data 22 in the memory 16.

FIG. 8B shows a table that stores the formation strategy 66 for various splines, including the spline S defined from point A to point A'. It is noted that the formation strategy 66 for the spline S includes a set of four formation types $FT_1$, $FT_2$, $FT_3$ and $FT_4$ (and their respective position role descriptor tables 60), as well as the NPC role descriptor table 64, to be described below. (In the interest of brevity, only the position role descriptor tables 60 for formation types $FT_1$ and $FT_4$ are illustrated in some detail in the illustrated example.)

Assume now that a group of NPCs 50 is to be assembled into a given formation F as described above with reference to the detection algorithm 600. The NPCs in the group may each be associated with a designated role 652 as defined in a "NPC role descriptor table" 64. With continued reference to FIG. 8B, an example of an NPC role descriptor table 64 is shown, which indicates, for each of the five NPCs, $NPC_1$ through $NPC_5$ as listed in column Actor ID 654, a designated role 652 for that NPC. Examples of roles 652 have been given above. One difference, however, is that a given NPC associated with the role 652 "free" (i.e., when the term "free" appears in the NPC role descriptor table 64 for the given NPC) means that the given NPC may occupy any position $P_i$, irrespective of the role 650 associated with that position $P_i$ in the position role descriptor table 60. The NPC role descriptor table 64 may be stored as part of the game data 22 in the memory 16.

Clearly, some matching is required between the roles 650 associated with the positions $P_i$ of a given formation type $FT_i$ (as encoded by the position role descriptor table 60) and the roles 652 associated with the NPCs (in the NPC role descriptor table 64). This will now be described in greater detail.

Initial Selection of Formation

Having determined that a group of NPCs 50 is to be assembled into an initial formation $F_i$, the game engine 14 is configured to execute a formation selection/matching algorithm 900 to answer the following key considerations: (I) which formation type to select from the formation strategy 66 (when the formation strategy 66 includes a set of more than one "candidate" formation type $\{FT_i\}$) and (II) in what positions $P_i$ (e.g., $P_1 \ldots P_6$) to place the various NPCs (e.g., $NPC_1 \ldots NPC_5$). As such, the formation selection/matching algorithm 900 (i.e. the mapping algorithm) involves assigning the video game characters $30_i$ in the formation F (e.g. NPCs) to a character position $P_i$ in the selected formation type based on a match between the roles 650 associated with the character positions $P_i$ of the selected formation type and the roles 652 associated with the video game characters $30_i$ in the formation $F_i$.

In order to answer the above considerations, the formation selection/matching algorithm takes into consideration of a variety of criteria, which may include the criteria listed below.

Thus, for each candidate formation type $FT_i$, a rating may be established based on:
- The percentage of positions that would be naturally available/present on the navmesh 26
  - Higher percentages are associated with higher ratings:
    A formation position $P_i$ is considered as available/present: if the position $P_i$ is currently on the navmesh 26 based on a current master position $P_C$ (the current position of the formation master M); and if the position will be on the navmesh 26 based on the projected master position $P_f$ (a future position of the master based on his current location, its speed and a projection time).
- The formation surface
  - Wider or smaller candidate formation types $FT_i$ may garner a higher rating, depending on a definable variable: This is based on the data provided to the strategy 66. Users can feed a spacing curve to the strategy 66 to define if a position far or close from another will have a higher or lower cost (e.g., in terms of computational resources). By default, wider formations F may be weighted as more attractive, but this is not a requirement.
- How well the position role descriptor table 60 for the candidate formation type $FT_i$ matches with the NPC role descriptor table 64
  - For example, if an NPC is associated with a "Front" role, candidate formation types $\{FT_i\}$ having a position $P_i$ associated with a "Front" role may be rated higher than those that do not;
- The distance from every NPC from their current spatial coordinates XYZ to their hypothetical position $P_i$ within the candidate formation type $FT_i$
  - Candidate formation types $FT_i$ with smaller such distances may be ranked higher as they require less movement from the NPCs once the formation $F_i$ is created.

Figure 11:
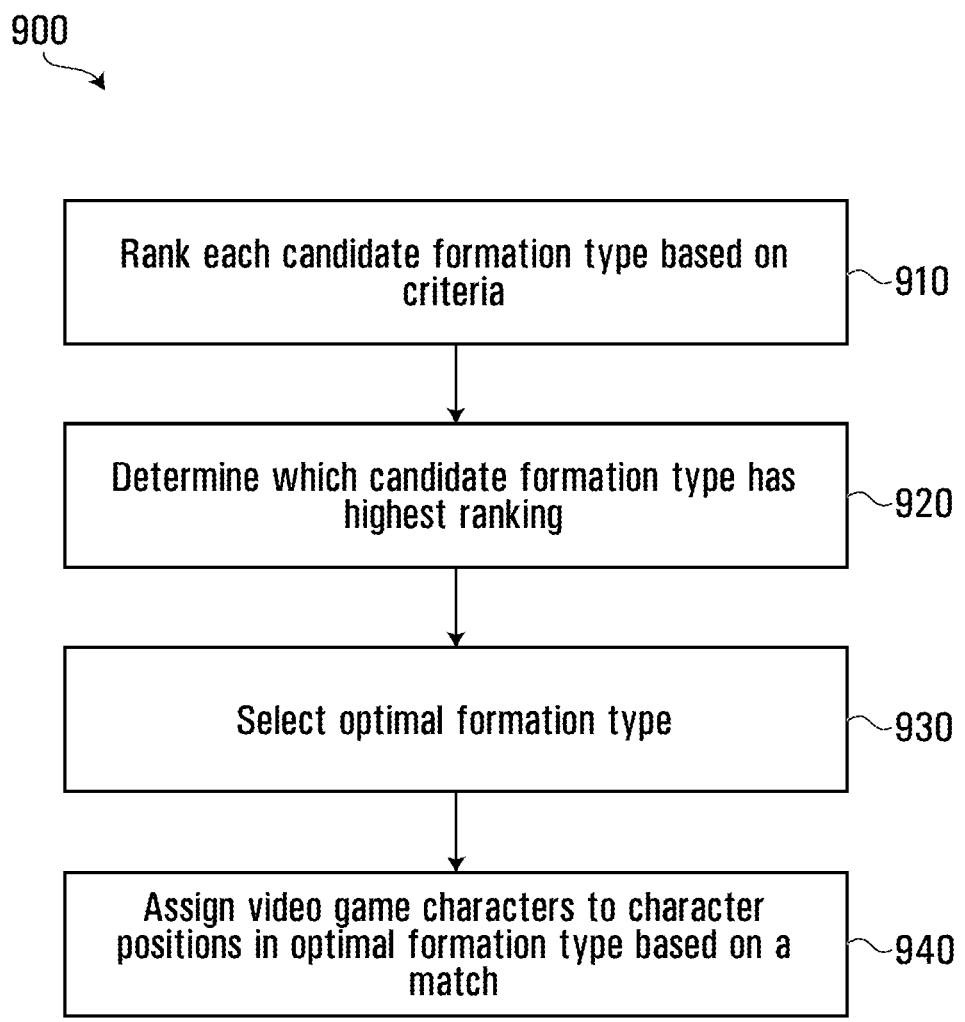
FIG. 11 is a flowchart illustrating steps of the formation selection/matching algorithm, in accordance with a non-limiting embodiment.

Reference is now made to the flowchart in FIG. 11 showing steps in the formation selection/matching algorithm 900 executed by the game engine 14. At step 910, each of the candidate formation types $FT_i$ is ranked based on a variety of criteria (as listed above, for example). At step 920, the candidate formation type $FT_i$ with the highest ranking is determined and at step 930 and therefore selected. At step 940, video game characters $30_i$ (e.g., NPCs) are assigned to character positions $P_i$ in the selected formation type $FT_i$.

The selected candidate formation type (e.g., having the highest rating based on the above-described criteria and possibly other criteria) may be referred to as the "optimal formation type". However, it should be understood that "optimal" does not require strict optimality in a mathematical sense; it simply can refer to a candidate formation type $FT_i$ deemed to be meet the criteria to a greater degree (or having a higher rating) than at least one other candidate formation type $FT_i$.

Figure 10B:
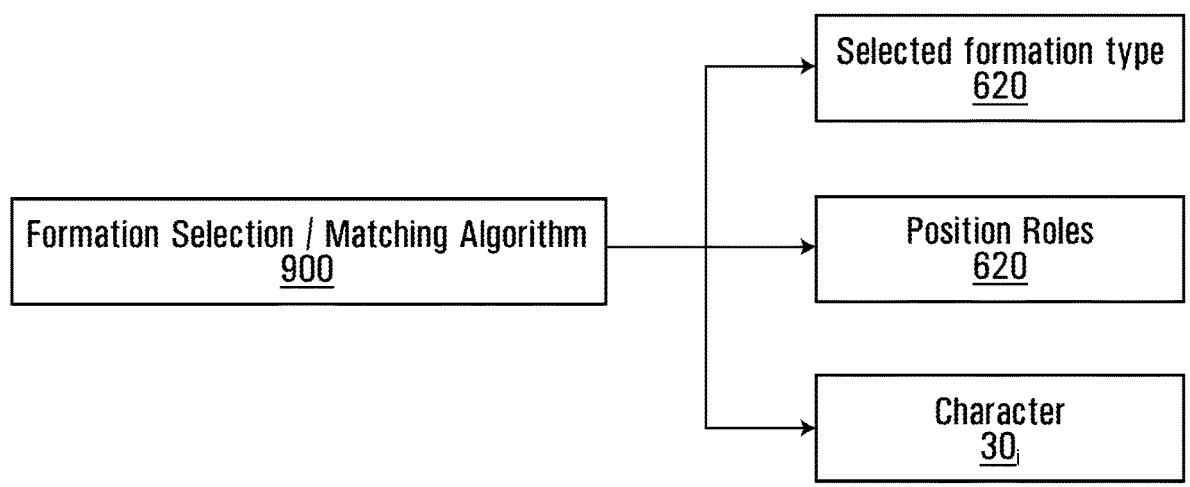
FIG. 10B shows a block diagram of the relationship between the formation selection/matching algorithm and (i) a selected formation type (ii) position roles of the selected formation type and (iii) the video game characters, in accordance with a non-limiting embodiment.

The aforementioned information may be summarized by the table shown in FIG. 10A, whereby there is a field for a group ID 610 (a set of NPCs such as NPC1 . . . NPC5), the current formation type 620 (e.g., $FT_1$, $FT_2$, . . . , in this case $FT_1$), an identification of the formation master M (in this case, the PC), the spatial coordinates of the formation reference point 630 (in this case, the formation center R), a list of positions associated with the formation type 640 (e.g., $P_1 \ldots P_6$), and for each position $P_i$: if it is occupied by an NPC, then the role (e.g., Free, Front, . . . ) of that NPC and its identity (e.g., NPC1 . . . NPC5), or if it is not occupied, the list of allowable roles for that position $P_i$. With reference to FIG. 10B, the selected formation 620, the roles 650 and the characters $30_i$ are a function of the formation selection/matching algorithm 900. The spatial coordinates XYZ of the formation reference point R is a function of the movement of the formation master M.

Once a given formation F has been created, the formation reference point R may be constrained to stay on the spline S even if the formation master M (e.g., the PC) leaves the detection zone D. In fact, if the formation master M (e.g., the PC) exits the detection zone D and stays outside the detection zone D but has a component of movement along the general direction of the spline S (see, for example, point 602 in FIG. 6A), the formation reference point R (and the formation as a whole) could move commensurately along the spline S.

In other embodiments (not shown in FIG. 6A), if the formation master M (e.g., the PC) exits the detection zone D and stays outside the detection zone D but has a component of movement along the general direction of the spline S, the formation reference point R (and the formation F as a whole) may remain in position and not move until the formation master M has entered the detection zone D.

Dynamic Selection of Formation

A key feature of the present disclosure is that, as a given formation F of NPCs moves along a given spline, the formation type $FT_i$ changes dynamically to result in a more natural and fluid movement of the given formation F.

One of the factors that has been found to affect the perceived naturalness and fluidity of movement of a formation of NPCs along a given spline is the timing of the change in the formation type $FT_i$.

For example, it has been found that changing the formation type $FT_i$ based on anticipated changes in the navmesh 26 properties may result in a more natural movement of the group of NPCs 50 along the given spline. The game engine 14 may carry out a "dynamic formation management process" 1100 for this purpose.

Specifically, to anticipate changes in the navmesh 26 properties that may affect what is the selected (or "optimal") formation type, the game engine 14 can evaluate changes that take place ahead of the movement of the formation reference point R (e.g., the formation center) in the general direction along the given spline.

Figure 13C:
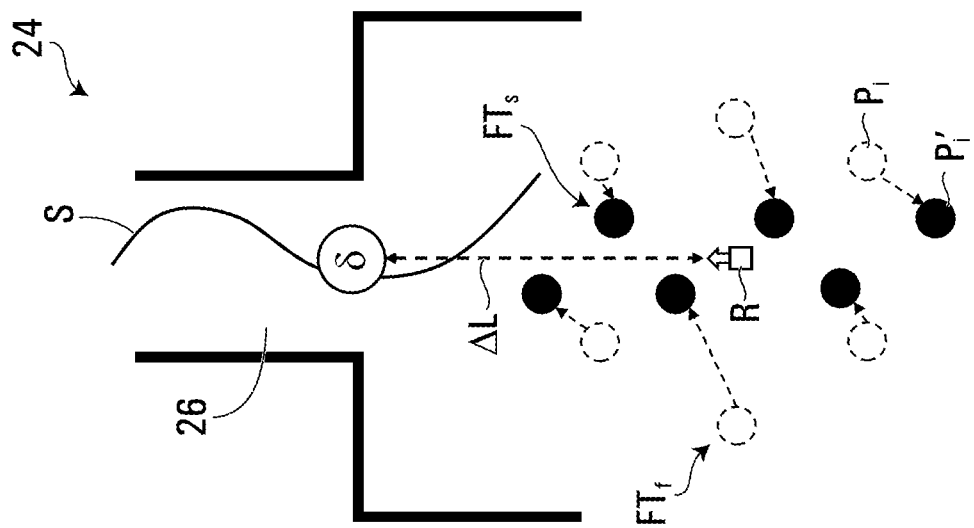
FIGS. 13A, 13B and 13C shows a first non-limiting embodiment of the dynamic formation management process of FIG. 12.
Figure 13B:
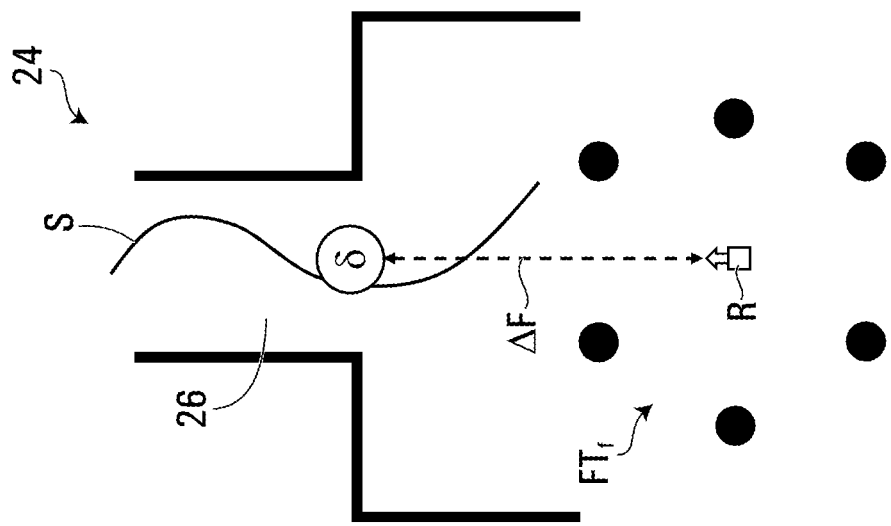
Figure 13A:
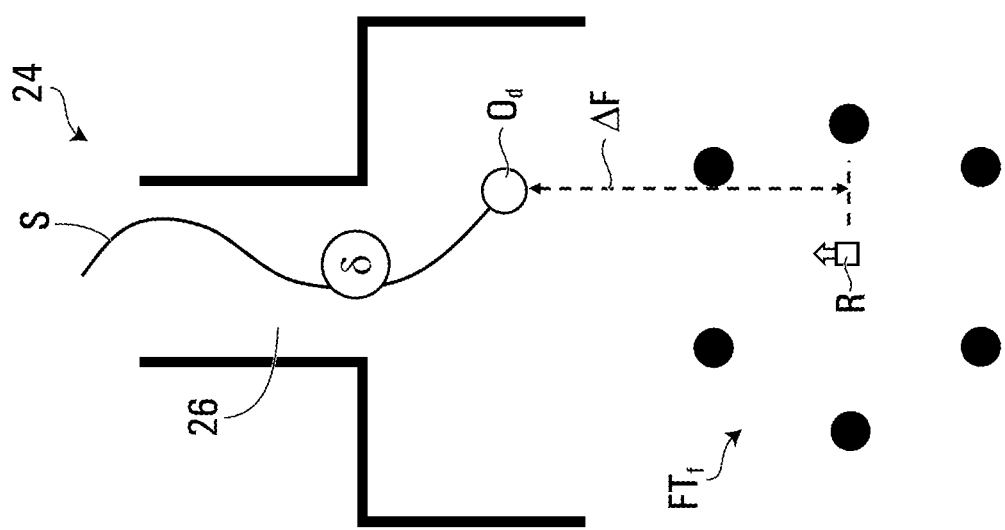

In one example, with reference to FIG. 13A, the game engine 14 is configured to identify a point $O_d$ along another embodiment of a spline (denoted S) that is at a fixed distance ΔF ahead of the current spatial coordinates XYZ of the formation reference point R (e.g., the formation center). For instance, ΔF may be 10 meters, 20 meters or 50 meters, to name a few non-limiting possibilities.

Figure 14C:
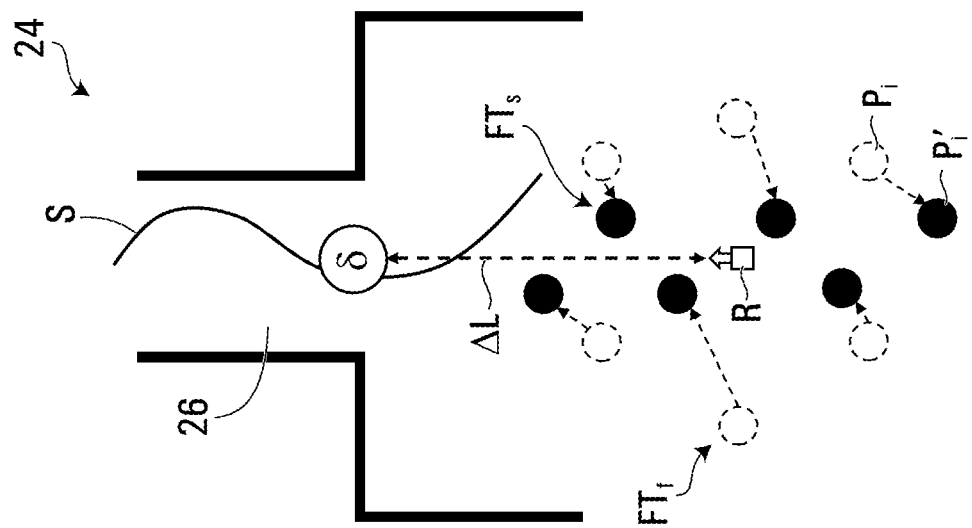
FIGS. 14A, 14B and 14C shows a second non-limiting embodiment of the dynamic formation management process of FIG. 12.
Figure 14B:
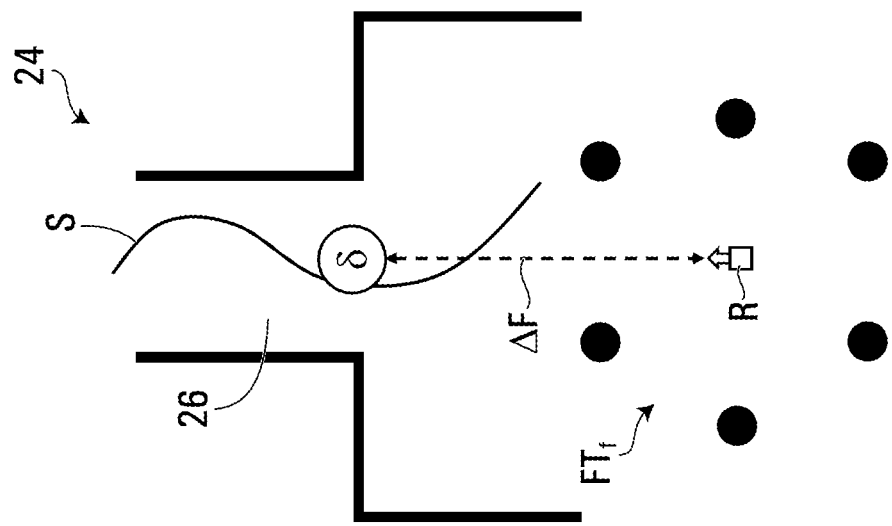
Figure 14A:
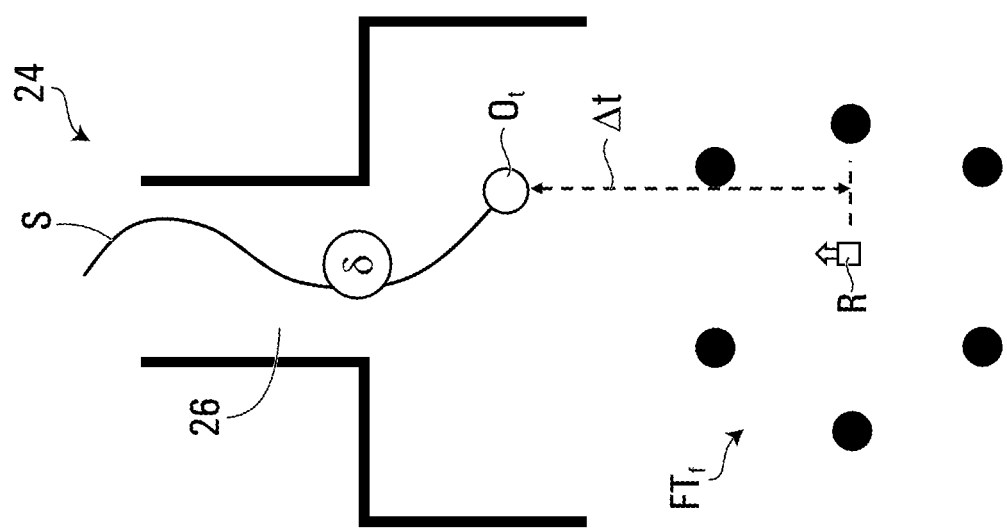

In another example, as shown in FIG. 14A, the game engine 14 is configured to identify a point $O_t$ along the spline S that is a certain number of seconds away from the current spatial coordinates XYZ of the formation reference point R (e.g., the formation center), which takes into account the speed of the formation reference point R. To this end, a look-ahead time Δt may be consulted. As such, the point ahead of the formation (i.e., point $O_t$) is computed based on a speed of travel of the formation and a look-ahead time Δt. The speed of travel of the formation may be considered to be the speed of travel of a reference point of the formation R. The look-ahead time Δt can be fixed or variable stored in the memory 16; in an example, it can be 1 second, 5 seconds or 10 seconds, to name a few non-limiting possibilities.

Figure 12:
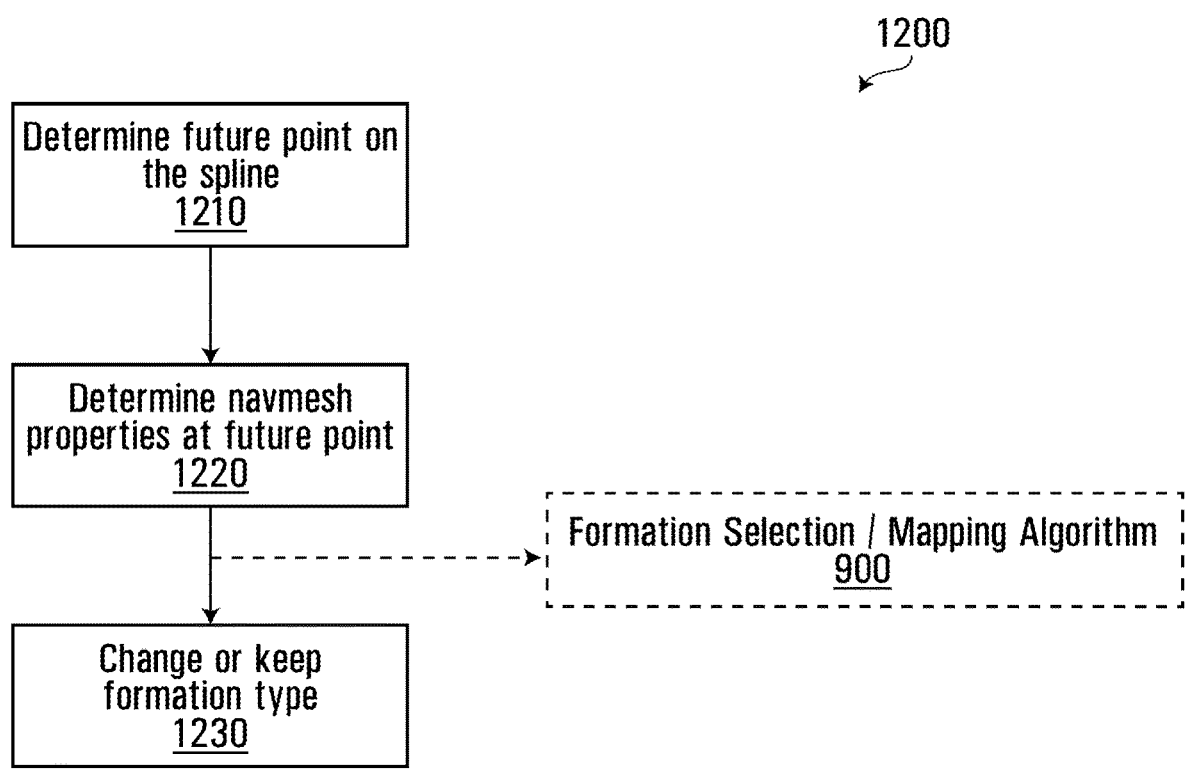
FIG. 12 is a flowchart illustrating steps of a dynamic formation management process, in accordance with a non-limiting embodiment.

Reference is now made to the flowchart in FIG. 12 showing steps in the dynamic formation management process 1200 executed by the game engine 14.

It is noted that the combination of the speed of the formation reference point R (e.g., the formation center) along the spline S and the look-ahead time Δt allows the game engine 14 to compute the point along the spline where the formation reference point R would end up if it were to continue along its current course for an amount of time equivalent to the look-ahead time (hereinafter referred to as a "future point"). This is shown at step 1210 of FIG. 11.

At step 1220, the game engine 14 then determines the navmesh 26 properties at this future point. At step 1230, the game engine 14 decides whether the formation type $FT_i$ can remain the same or should be changed. For example, the game engine 14 may re-run the previously described formation selection/matching algorithm 900 based on the "future point" and see whether the "optimal" formation type resulting from this computation corresponds to the current formation type $FT_i$.

If yes, the formation type $FT_i$ need not be changed.

If no, the formation type $FT_i$ is changed to the optimal formation type.

The previously discussed criteria may be used by the formation selection/matching algorithm 900 in order to change the formation type of the formation F from a first formation type $FT_f$ (which may be the initial formation type $FT_i$) to a second formation type $FT_s$. Each of the first and second formation types $FT_f$, $FT_s$ have their own particular characteristics and attributes (e.g. spatial distribution of character positions $P_i$, width $W_i$ of formation as shown in FIG. 5, etc.)

Thus, it is understood that changing the formation type $FT_i$ from the first formation type $FT_f$ to the second formation type $FT_s$ may include selecting the second formation type $FT_s$ from a set of candidate formation types $\{FT_i\}$ based on a ranking of each of the candidate formation types $\{FT_i\}$, as previously discussed.

As such, selecting the second formation type $FT_s$ from the set of the candidate formation types $\{FT_i\}$ may be carried out based on a relative width of the spatial distribution of character positions associated with each of the candidate formation types $\{FT_i\}$ if the candidate formation type were selected as the second formation type $FT_s$.

Additionally, selecting the second formation type $FT_s$ from the set of candidate formation types $\{FT_i\}$ may be carried out based on a relative number of character positions $P_i$ that would remain on the navmesh 26 if the candidate formation type were selected as the second formation type $FT_s$.

Furthermore, selecting the second formation type $FT_s$ from the set of candidate formation types $\{FT_i\}$ may be carried out based on a total distance needing to be traveled by one or more of the video game characters $30_i$ between its character position $P_i$ in the first formation type $FT_f$ to its corresponding character position $P_i'$ in the candidate formation type $FT_i$ if the candidate formation type were selected as the second formation type $FT_s$.

Also, selecting the second formation type $FT_s$ from the set of candidate formation types $\{FT_i\}$ may be carried out based on the extent to which the video game characters $30_i$ cross paths in transitioning between their character positions $P_i$ in the first formation type $FT_f$ to their corresponding character positions $P_i'$ in the candidate formation type if the candidate formation type were selected as the second formation type $FT_s$.

Migration of the individual NPCs as they change formation types (i.e., the paths that video game characters $30_i$ travel as they transition from the character positions $P_i$ in the first formation type $FT_f$ to their corresponding character positions $P_i'$ in the second formation type $FT_s$) may be gradual, over one or several rendered frames.

In some embodiments, the algorithm of FIG. 12 is designed to be performed within 0.75 milliseconds, whereas the spline S may be computed in advance, during an initial phase.

In both variants of the dynamic formation management process 1200, namely the look-ahead point based on distance and the look-ahead point based on time, an early change in the formation type, i.e., well ahead of the change in the navmesh 26 characteristics (such a change being denoted by the symbol "6" in FIGS. 13A to 13C and FIGS. 14A to 14C, for example), causes motion of the group of NPCs 50 to be more natural-seeming as changes in terrain characteristics (e.g. elevation, dimensions, path width, etc.) will be anticipated rather than reacted to. Thus, anticipating a change in terrain characteristics of the path at a future point of the formation (e.g. determining that a dimension of the path is different at said point than at a reference point) can render more natural following movement of the given formation F.

This is particularly effective in creating a natural effect when a decrease in path width along the navmesh 26 is foreseen. This effect is illustrated in FIGS. 13A to 13C and FIGS. 14A to 14C by way of example.

It is also envisaged that the game engine 14 may maintain a damping memory 25 for the selected formation type 620 so as to prevent the selected formation type 620 from switching too quickly, even if it would be considered more "optimal" to do so.

Figure 15:
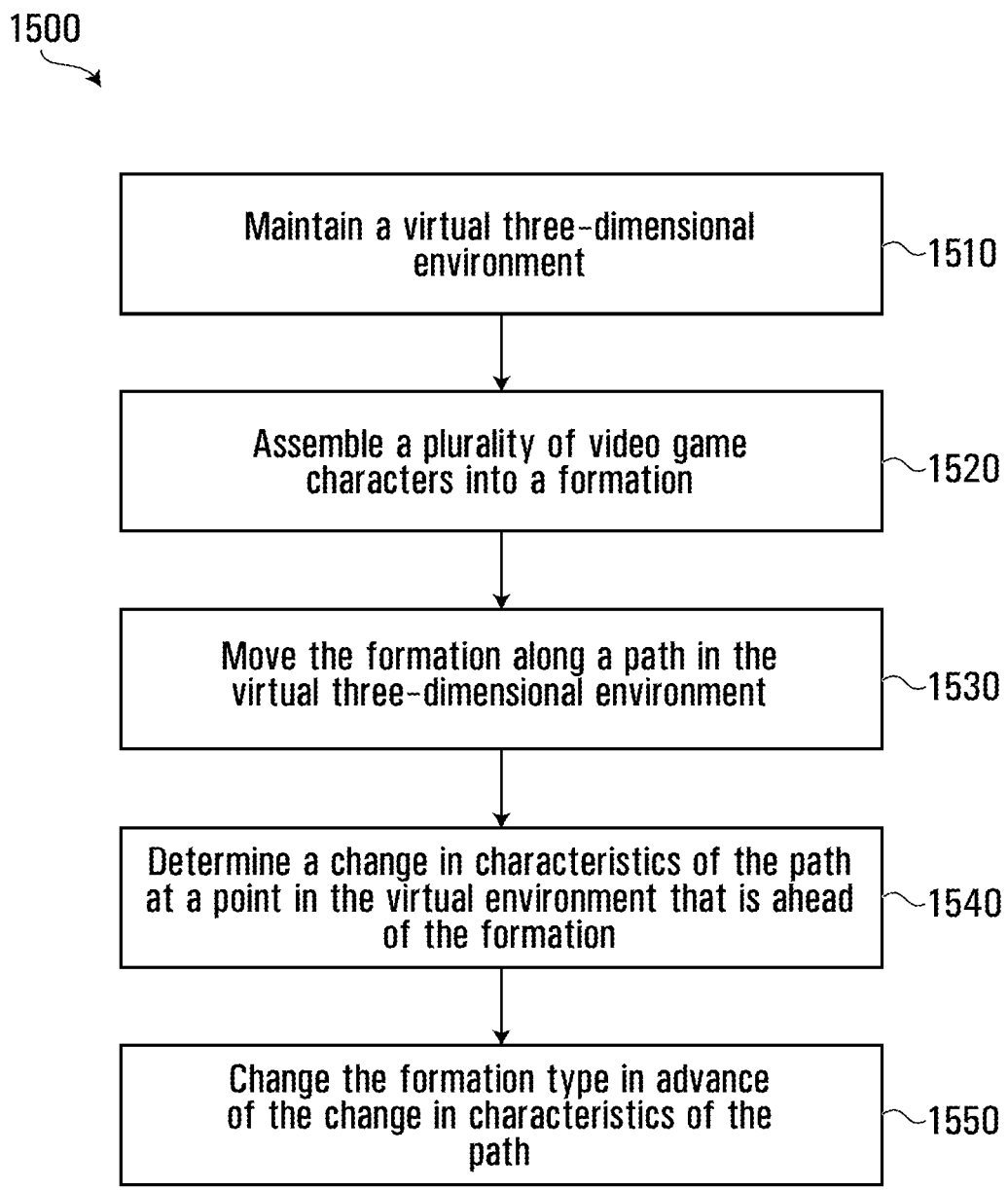
FIG. 15 is a flowchart illustrating steps of one non-limiting embodiment of a method for execution by a processor of the video game apparatus of FIG. 1A.
Figure 16A:
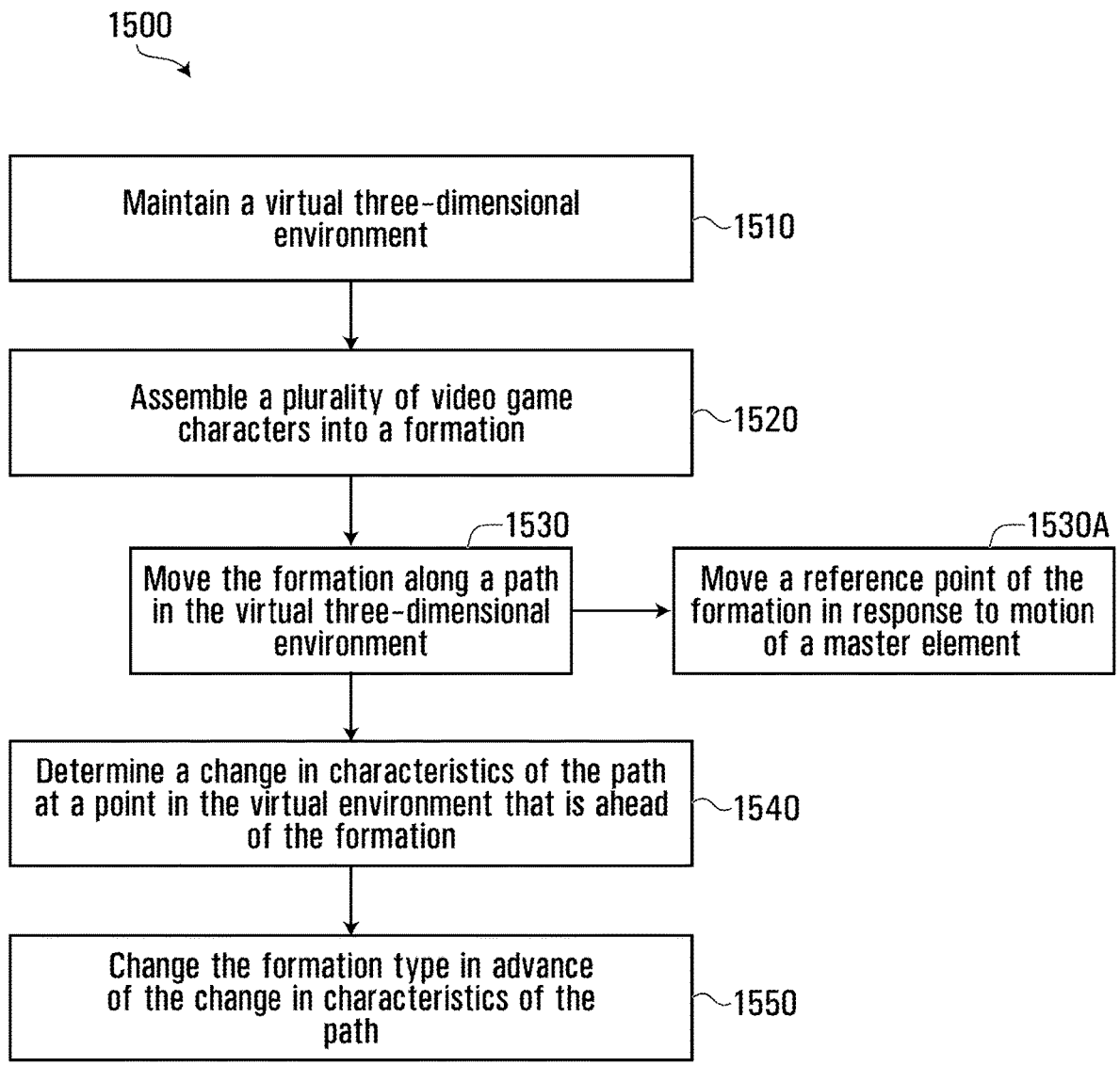
FIGS. 16A, 16B, 16C and 16D are flowcharts illustrating steps of alternative non-limiting embodiments of the method of FIG. 15.
Figure 16B:
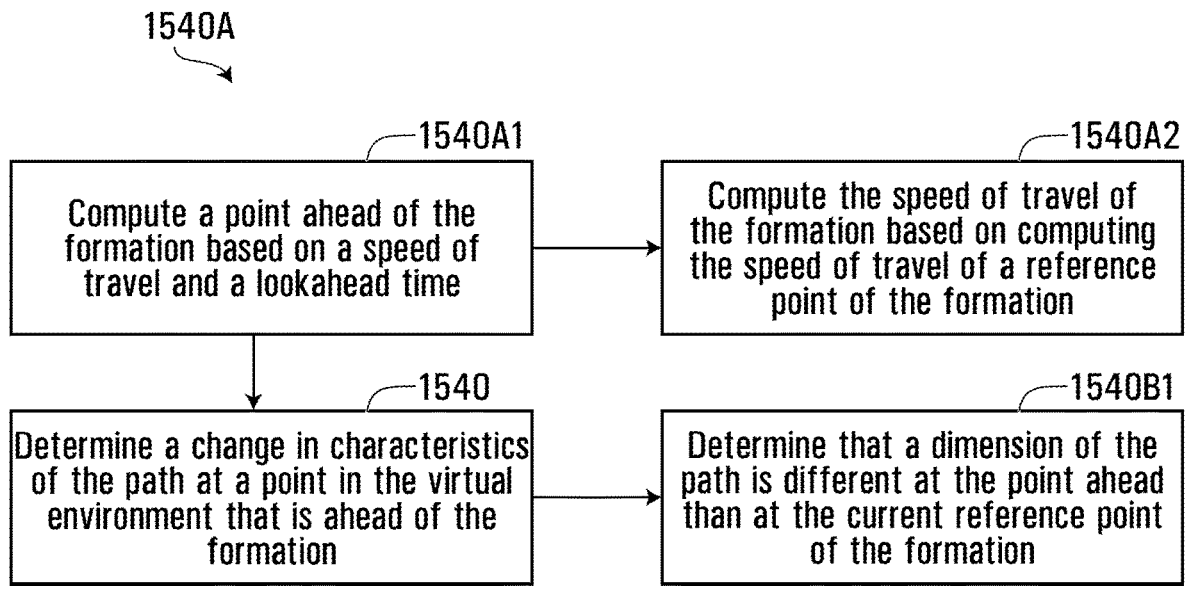
Figure 16C:
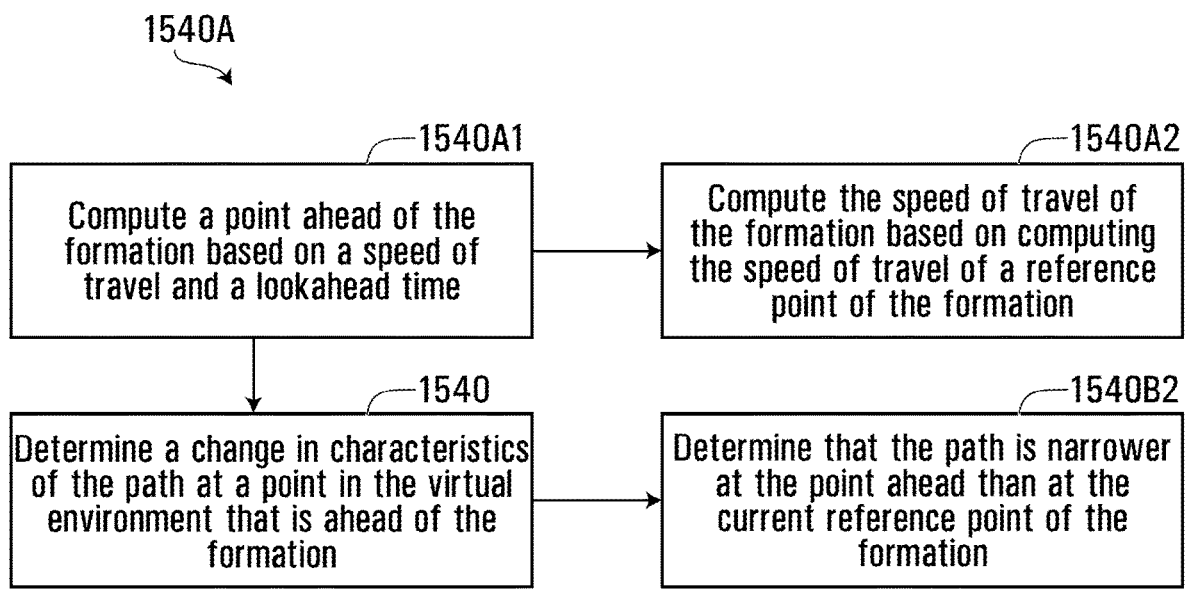
Figure 16D:
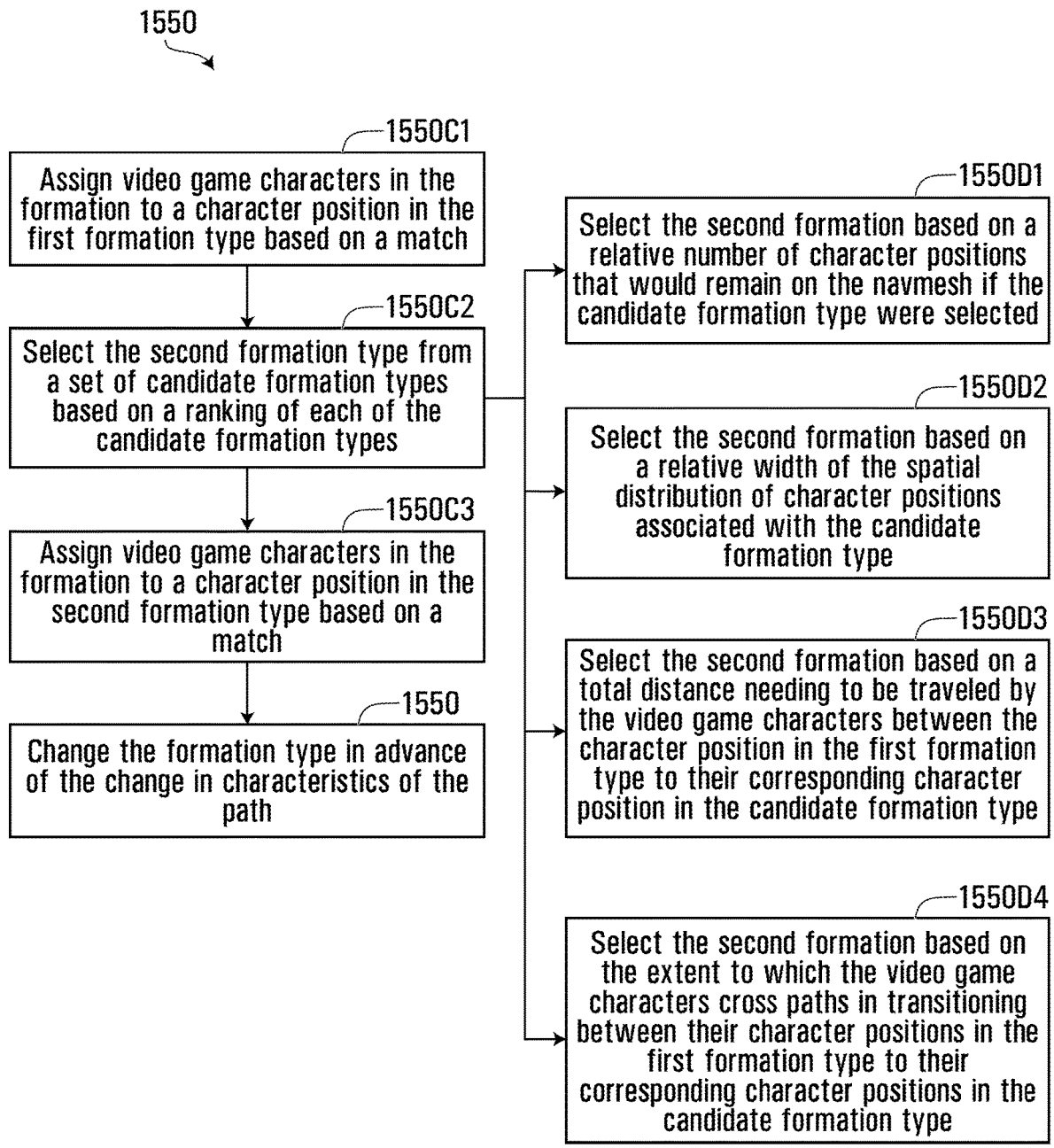

With reference therefore to FIG. 15, it will be appreciated that there has been provided a method for execution by at least one processor 12, which comprises a step 1510 of maintaining a virtual environment 24 in the memory 16, the 3D virtual environment 24 including a player character PC, a step 1520 of causing a plurality of video game characters $30_i$ to travel along a path in the virtual three-dimensional environment 24 in a formation F, the formation F having a formation type $FT_i$, the formation type $FT_i$ being a first formation type $FT_f$, a step 1530 of moving the formation F along the path, a step 1540 of determining a change in characteristics of the path at a point $O_d$, $O_t$ in the virtual three-dimensional environment 24 that is ahead of the formation; and, in response to step 1540, a step 1550 of changing the formation type $FT_f$ to a second formation type $FT_s$ in advance of the change in characteristics of the path, i.e., at a point in time before the formation reaches the point $O_d$, $O_t$.

Additional steps may be included in the method as will be discussed below with reference to FIGS. 16A, 16B, 16C, 16D and 16E.

A step 1530A wherein moving the formation F along the path is in response to motion of a master element (formation master M) associated with the group of video game characters 30 and may include moving a reference point R of the formation F in response to motion of the formation master M.

A step 1540A1 wherein computing the point ahead of the formation $O_d$, $O_t$ may be based on (i) a speed of travel of the formation; and (ii) a look-ahead time $\Delta t$.

A step of 1540A2 wherein computing the speed of travel of the formation F may include computing the speed of travel of the reference point of the formation R.

A step 1540B1 wherein determining a change in characteristics of the path at the point $O_d$, $O_t$ that is ahead of the formation F may include determining that a dimension of the path (e.g., width) is different at point $O_d$, $O_t$ than at the reference point (e.g. reference point of the formation R).

A step 1540B2 wherein determining a change in characteristics of the path at the point $O_d$, $O_t$ that is ahead of the formation F may include determining that the path is narrower at point $O_d$, $O_t$ than at the reference point of the formation R.

A step 1550C1 wherein assigning the video game characters $30_i$ in the formation to a character position $P_i$ in the first formation type $FT_f$ is based on a match between the roles associated with the character positions 650 of the first formation type $FT_f$ and the roles 652 associated with the video game characters in the formation.

A step 1550C2 changing the formation type FT to the second formation type $FT_s$ includes selecting the second formation type $FT_s$ from a set of candidate formation types $\{FT\}$ based on a ranking of each of the candidate formation types and associated with respective spatial distributions of character positions $P_i$.

A step 1550C3 wherein assigning the video game characters $30_i$ in the formation to a character position $P_i$ in the second formation type $FT_s$ based on a match between the roles associated with the character positions 650 of the second formation type $FT_s$ and the roles 652 associated with the video game characters in the formation.

Selecting the second formation type $FT_s$ from the set of candidate formation types $\{FT_i\}$ is carried out based on:
  a relative number of character positions $P_i$ that would remain on the navmesh 26 if the candidate formation type were selected as the second formation type $FT_s$ (at step 1550D);
  a relative width W of the spatial distribution of character positions $P_i$ associated with the candidate formation type $FT_i$ if the candidate formation type were selected as the second formation type $FT_s$ (at step 1550D2);
  a total distance needing to be traveled by one or more of the video game characters $30_i$ between its character position $P_i$ in the first formation type $FT_f$ to its corresponding character position $P_i'$ in the candidate formation type if the candidate formation type were selected as the second formation type $FT_s$ (at step 1550D3); and
  the extent to which the video game characters $30_i$ cross paths in transitioning between their character positions $P_i$ in the first formation type $FT_f$ to their corresponding character positions $P_i'$ in the candidate formation type if the candidate formation type were selected as the second formation type $FT_s$ (at step 1550D4).

Additional Considerations

Additional features of the game engine may keep movement of the formation natural and improve group cohesion throughout gameplay.

Figure 9A:
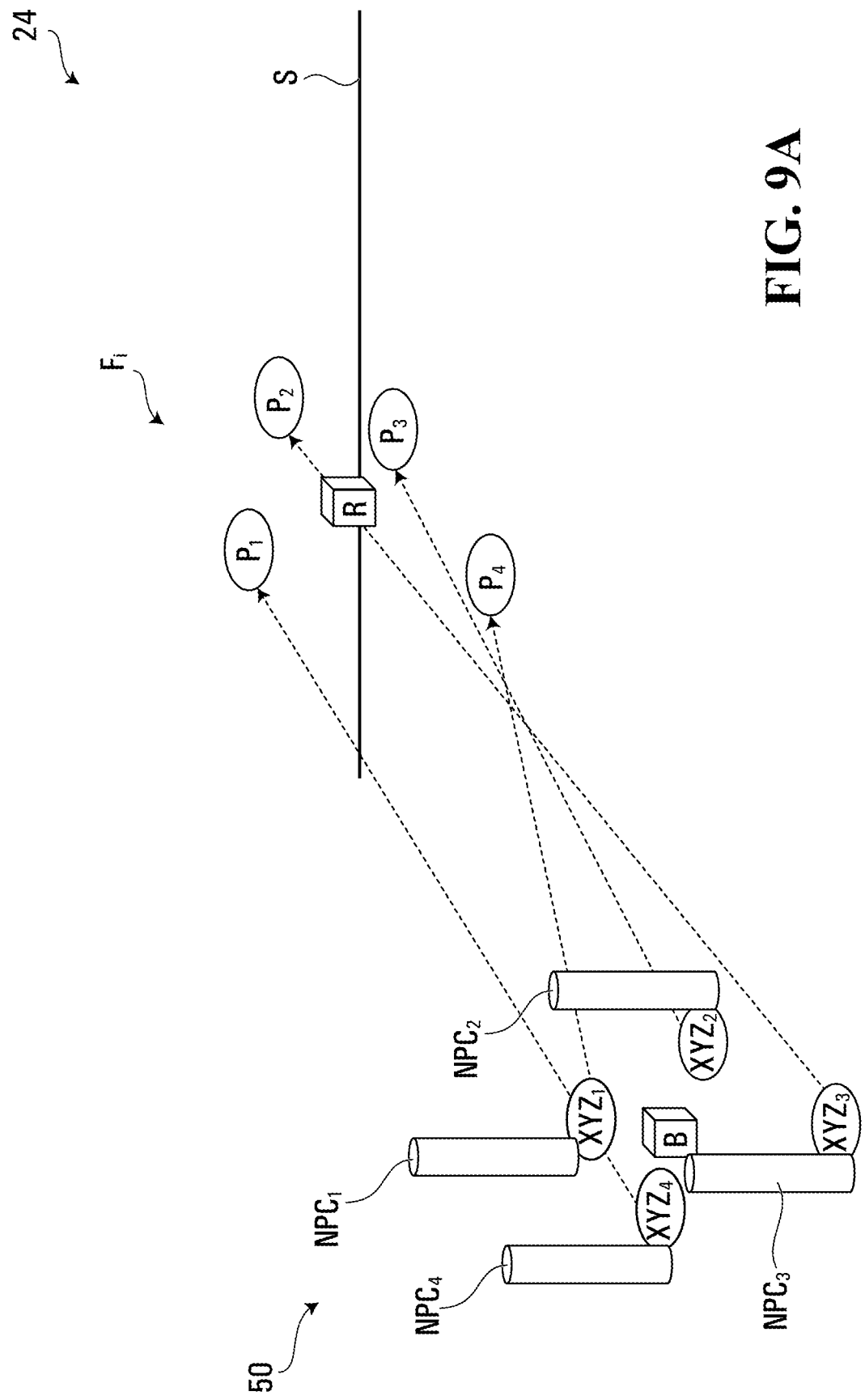
FIG. 9A shows an example of movement of NPCs as they assemble into another embodiment of a formation without the use of a formation selection/matching algorithm.

For example, consider the scenario in FIG. 9A, where a group 50 of NPCs ($NPC_1 \ldots NPC_4$) have spatial coordinates ($XYZ_1 \ldots XYZ_4$). Consider also that the formation master (not shown) has entered the detection zone (not shown) and that the game engine 14 determines that it is time to create a formation with relative positions $P_1 \ldots P_4$ with a formation reference point R. Let it be assumed that the NPCs do not have an assigned role 650.

As such, each NPC is free to select their own position $P_i$ in the formation $F_i$ (for the purposes of this example, it is assumed that all the positions $P_1 \ldots P_4$ in the formation are available and are exempt of any matching restrictions). It is therefore conceivable that $NPC_1$ will migrate to position $P_4$ given that, for example, $NPC_1$ happens to be the closest NPC to position $P_4$. It is also conceivable that $NPC_2$ may then migrate to position $P_3$ if, for example, $NPC_2$ happens to be the closest remaining NPC to position $P_3$. This would constrain the available positions to which the other NPCs ($NPC_3$, $NPC_4$) may migrate, which may result in the paths of individual NPCs crossing over as the formation is created. This may result in unnatural and/or undesirable visual artifacts.

Figure 9B:
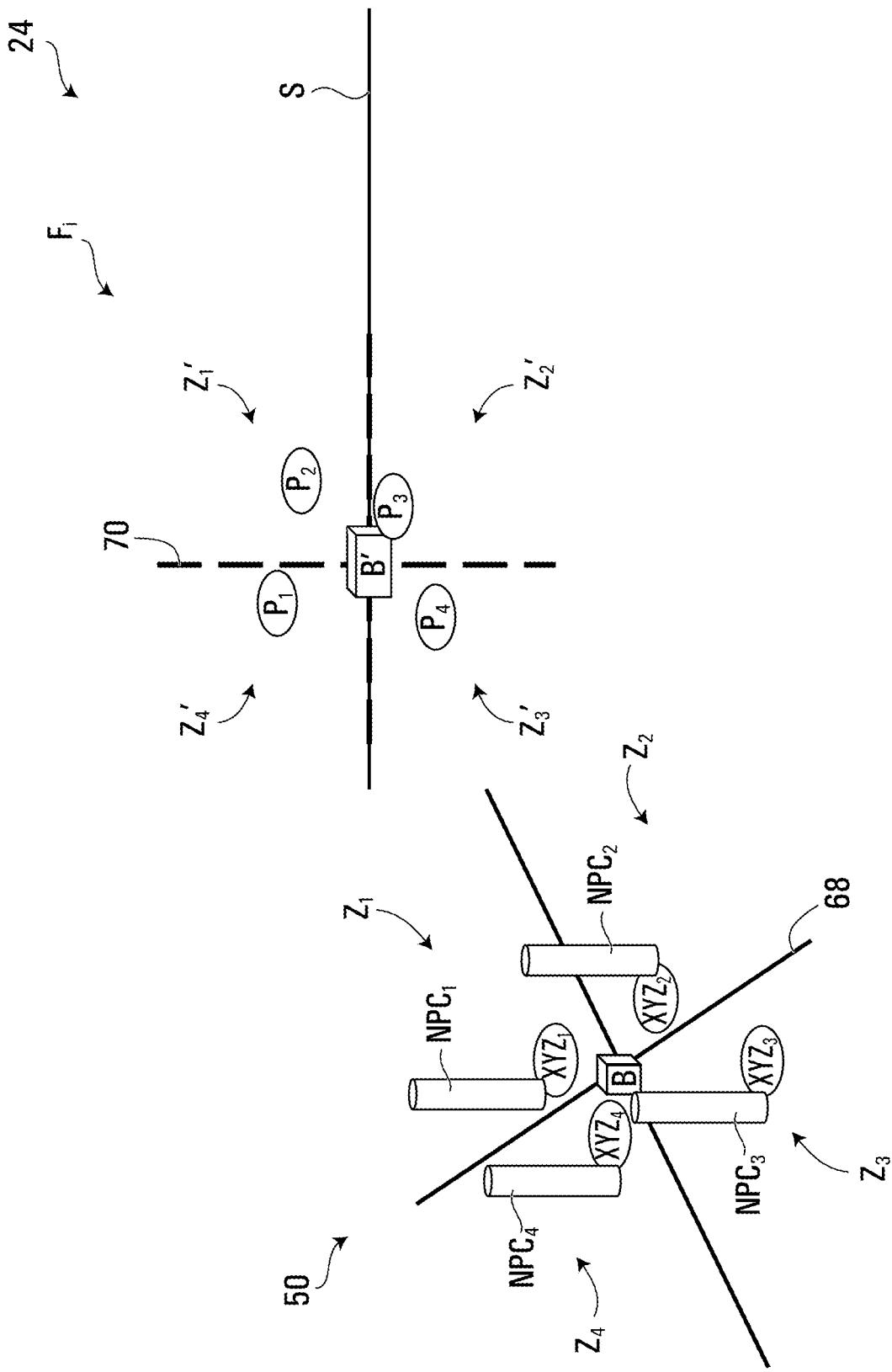
FIGS. 9B and 9C show an example of movement of NPCs as they assemble into the formation of FIG. 9A with the use of a formation selection/matching algorithm, in accordance with a non-limiting embodiment.

The game engine 14 may be configured to implement features that prevent unnatural crossover between the NPCs. For example, with reference to FIG. 9B, consider a barycentric point B of the group of NPCs 50 and a barycenter B' of the formation F on a given spline. Let there be defined four "quadrants" (or zones) $Z_i$ (i=1, 2, 3, 4) defined with B as the origin and four quadrants (or zones) $Z'_i$ (i=1, 2, 3, 4) defined with B' as the origin. Therefore, the spatial coordinates ($XYZ_1 \ldots XYZ_4$) for each of the NPCs ($NPC_1 \ldots NPC_4$) lies in one of the zones ($Z_1 \ldots Z_4$).

Figure 9C:
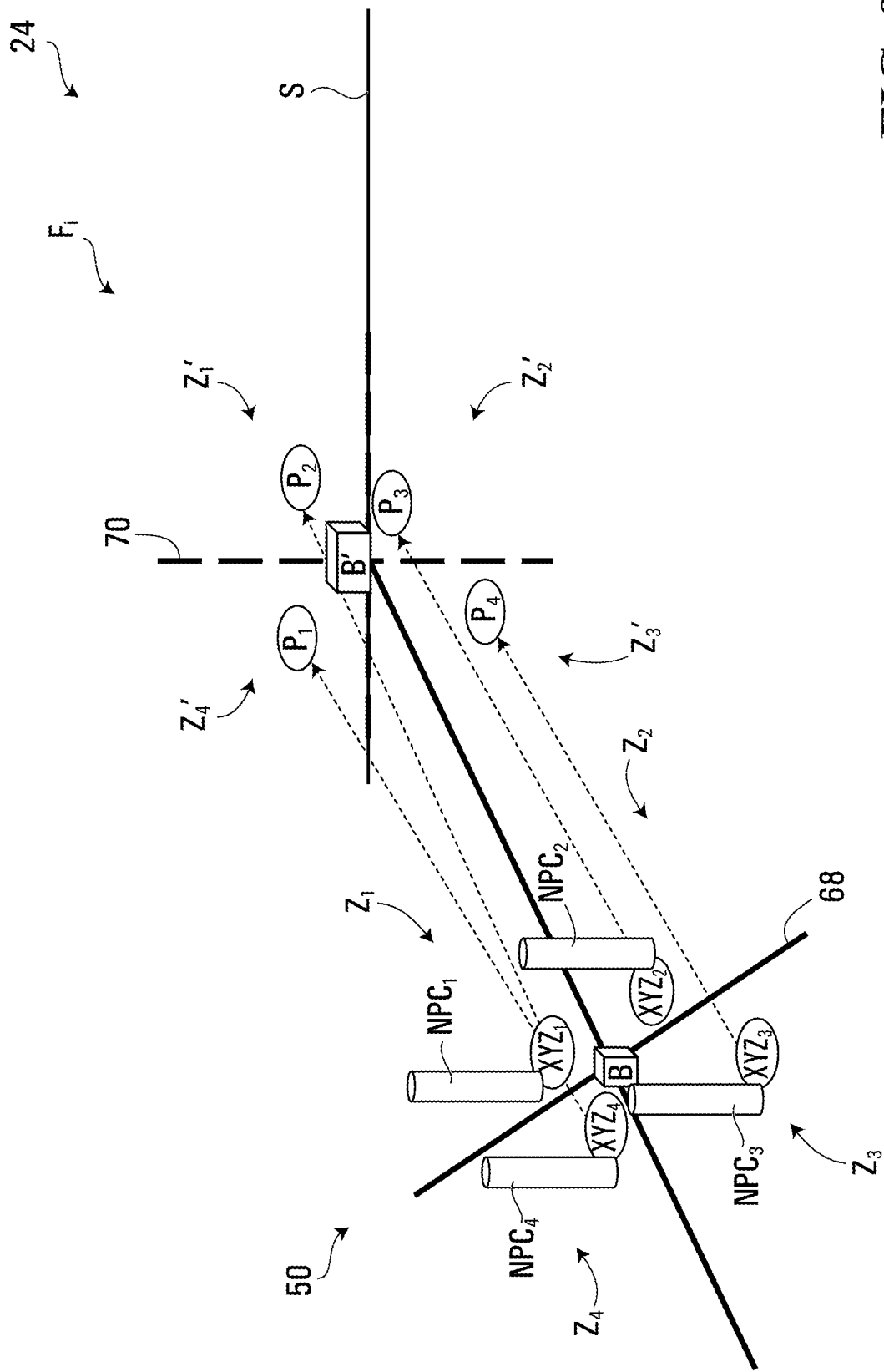

Referring now to FIG. 9C, the game engine 14 may be configured to move the NPCs into positions $P_1 \ldots P_4$ in a way that preserves the relative quadrant positions of the NPCs before and after the formation is created. As such, $NPC_1$, which occupies coordinates $XYZ_1$ in quadrant $Z_i$, will occupy quadrant $Z'_1$ in the formation, $NPC_2$, which occupies coordinates $XYZ_2$ in quadrant $Z_2$, will occupy quadrant $Z'_2$ in the formation, and so on.

It will be appreciated that in other embodiments, a similar effect can be obtained by respecting the angular order in which the NPCs appear around the barycenter B and the barycenter B'. As such, it has been shown how the game engine 14 may be designed to prevent the scenario in which an NPC that is at one point "behind" the group suddenly moves in front of the group, by itself, when the formation is created (or when the formation type is changed).

Certain embodiments disclosed herein can be implemented as hardware, firmware, software, or a combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. The machine may be implemented on a computer platform having hardware such as one or more central processing units ("CPUs") and/or graphics processing units ("GPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The examples and language recited herein are intended for pedagogical purposes to aid the reader in understanding the principles of the disclosed embodiments and concepts, and are to be construed as being without limitation to such specifically recited examples and language. Moreover, statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that certain adaptations and modifications of the described embodiments can be made. Therefore, the above discussed embodiments are to be considered illustrative and not restrictive. Also, it should be appreciated that additional elements that may be needed for operation of certain embodiments of the present invention have not been described or illustrated as they are assumed to be within the purview of the person of ordinary skill in the art. Moreover, any feature of any embodiment discussed herein may be combined with any feature of any other embodiment discussed herein in some examples of implementation. Moreover, certain embodiments of the present invention may be free of, may lack and/or may function without any element that is not specifically disclosed herein.

What is claimed is:

1. A computer-implemented method, comprising:
maintaining a virtual three-dimensional environment;
assembling a plurality of video game characters into a formation, each of the plurality of video game characters having a character type and a position in the virtual three-dimensional environment defined by spatial coordinates, the formation having a reference point and a formation type, the formation type being a first formation type;
moving the formation along a path in the virtual three-dimensional environment in response to motion of a master element associated with the plurality of video game characters, wherein moving the formation along the path comprises moving the reference point of the formation in response to motion of the master element such that spatial coordinates of the reference point are determined as a function of the motion of the master element and wherein the function is defined by one or more parameters, each of the one or more parameters designating a characteristic of motion of the formation and comprising a value;
responsive to determining a change in characteristics of the path at a point in the virtual three-dimensional environment that is ahead of the formation, changing the formation type to a second formation type in advance of the change in characteristics of the path.

2. The method defined in claim 1, further comprising computing the point ahead of the formation based on a speed of travel of the formation and a look-ahead time.

3. The method defined in claim 2, further comprising computing the speed of travel of the formation by computing a speed of travel of a reference point of the formation.

4. The method defined in claim 3, wherein the reference point of the formation is a center point or centroid of the formation.

5. The method defined in claim 1, wherein one of the parameters is a damping parameter.

6. The method defined in claim 1, wherein determining a change in characteristics of the path at the point that is ahead of the formation comprises determining that a dimension of the path is different at said point than at the reference point of the formation.

7. The method defined in claim 1, wherein the first formation type is characterized by a first width and the second formation is characterized by a second width different than the first width.

8. The method defined in claim 1, wherein the first formation type defines a first spatial distribution of character positions and the second formation type defines a second spatial distribution of character positions.

9. The method defined in claim 8, wherein each of the character positions of the first formation type and of the second formation type is associated with at least one role.

10. The method defined in claim 1, wherein each of the video game characters is associated with at least one role.

11. The method defined in claim 10, further comprising assigning the video game characters in the formation to a character position in the first formation type based on a match between roles associated with the character positions of the first formation type and the roles associated with the video game characters in the formation.

12. The method defined in claim 10, further comprising assigning the video game characters in the formation to a character position in the second formation type based on a match between the roles associated with the character positions of the second formation type and the roles associated with the video game characters in the formation.

13. The method defined in claim 1, wherein the first formation type defines a first set of relative character positions of the video game characters in the formation and the second formation type defines a second set of relative character positions of the video game characters in the formation.

14. The method defined in claim 1, wherein the path is located on a navigation mesh.

15. The method defined in claim 1, wherein the reference point of the formation is constrained to stay on a spline.

16. The method defined in claim 15, wherein the master element is not constrained to stay on the spline.

17. The method defined in claim 1, wherein changing the formation type to the second formation type includes selecting the second formation type from a set of candidate formation types based on a ranking of each of the candidate formation types.

18. The method defined in claim 1, wherein changing the formation type to the second formation type includes selecting the second formation type from a set of candidate formation types associated with respective spatial distributions of character positions.

19. The method defined in claim 18, wherein the path is located on a navigation mesh, wherein selecting the second formation type from the set of candidate formation types is carried out based on a relative number of character positions that would remain on the navigation mesh if the candidate formation type were selected as the second formation type.

20. The method defined in claim 18, wherein selecting the second formation type from the set of candidate formation types is carried out based on a relative width of the spatial distribution of character positions associated with the candidate formation type if the candidate formation type were selected as the second formation type.

21. The method defined in claim 18, wherein selecting the second formation type from the set of candidate formation types is carried out based on a total distance needing to be traveled by one or more of the video game characters between its character position in the first formation type to its corresponding character position in the candidate formation type if the candidate formation type were selected as the second formation type.

22. The method defined in claim 18, wherein selecting the second formation type from the set of candidate formation types is carried out based on an extent to which the video game characters cross paths in transitioning between their character positions in the first formation type to their corresponding character positions in the candidate formation type if the candidate formation type were selected as the second formation type.

23. The method defined in claim 1, wherein the master element is a playing character of the video game.

24. The method defined in claim 1, wherein the master element is an element other than a playing character of the video game.

25. The method defined in claim 1, wherein the first and second formation types are stored in a memory.

26. The method defined in claim 1, wherein determining a change in characteristics of the path at the point that is ahead of the formation comprises determining that the path is narrower at said point than at the reference point of the formation.

27. A non-transitory computer-readable storage medium comprising computer-readable instructions which, when read and executed by at least one processor, cause the at least one processor to execute a method that comprises:
    maintaining a virtual three-dimensional environment;
    assembling causing a plurality of video game characters into a formation, each of the plurality of video game characters having a character type and a position in the virtual three-dimensional environment defined by spatial coordinates, the formation having a reference point and a formation type, the formation type being a first formation type;
    moving the formation along a path in the virtual three-dimensional environment in response to motion of a master element associated with the plurality of video game characters, wherein moving the formation along the path comprises moving the reference point of the formation in response to motion of the master element such that spatial coordinates of the reference point are determined as a function of the motion of the master element and wherein the function is defined by one or more parameters, each of the one or more parameters designating a characteristic of motion of the formation and comprising a value; and
    responsive to determining a change in characteristics of the path at a point in the virtual three-dimensional environment that is ahead of the formation, changing the formation type to a second formation type in advance of the change in characteristics of the path.

28. An apparatus comprising:
    at least one processor;
    a memory storing data and instructions, the data representing a virtual three-dimensional environment; and
    an interface through which a user provides input and receives output,
    wherein the at least one processor is configured to execute the instructions in the memory for implementing a computer program that generates the output in response to the received input and, the computer program including at least one process that comprises:
        assembling a plurality of video game characters into a formation, each of the plurality of video game characters having a character type and a position in the virtual three-dimensional environment defined by spatial coordinates, the formation having a reference point and a formation type, the formation type being a first formation type;
        moving the formation along a path in the virtual three-dimensional environment in response to motion of a master element associated with the plurality of video game characters, wherein moving the formation along the path comprises moving the reference point of the formation in response to motion of the master element such that spatial coordinates of the reference point are determined as a function of the motion of the master element and wherein the function is defined by one or more parameters, each of the one or more parameters designating a characteristic of motion of the formation and comprising a value; and
        responsive to determining a change in characteristics of the path at a point in the virtual three-dimensional environment that is ahead of the formation, changing the formation type to a second formation type in advance of the change in characteristics of the path.

* * * * *